United States Patent
Johnson, Jr.

(10) Patent No.: US 11,004,444 B2
(45) Date of Patent: May 11, 2021

(54) SYSTEMS AND METHODS FOR ENHANCING USER EXPERIENCE BY COMMUNICATING TRANSIENT ERRORS

(71) Applicant: Amazon Technologies, Inc., Seattle, WA (US)

(72) Inventor: Charles Melvin Johnson, Jr., Hudson, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/699,066

(22) Filed: Sep. 8, 2017

(65) Prior Publication Data

US 2019/0080685 A1 Mar. 14, 2019

(51) Int. Cl.
*G10L 15/22* (2006.01)
*G10L 21/00* (2013.01)
(Continued)

(52) U.S. Cl.
CPC .............. *G10L 15/18* (2013.01); *G06F 3/167* (2013.01); *G06Q 30/0256* (2013.01);
(Continued)

(58) Field of Classification Search
CPC ......... G10L 15/18; G10L 15/22; G10L 21/00; G06F 17/30
(Continued)

(56) References Cited

U.S. PATENT DOCUMENTS 7,023,979 B1 * 4/2006 Wu ..................... H04M 3/5233
379/265.11
9,307,564 B2 * 4/2016 Kim .................... H04W 12/003
(Continued)

FOREIGN PATENT DOCUMENTS

WO 20160111881 A1 7/2016

OTHER PUBLICATIONS

International Search Report and Written Opinion for Application No. PCT/US2018/049690, dated Dec. 12, 2018.
(Continued)

*Primary Examiner* — Seong-Ah A Shin
(74) *Attorney, Agent, or Firm* — Pierce Atwood LLP

(57) ABSTRACT

This patent application is directed to interaction between a voice-controlled device and a language processing system that processes user requests. The requests can be requests for information or they can be requests to control a device, such as "Turn on the bedroom light." The disclosure includes various embodiments for trying to resolve system errors in a manner that provides an improved customer experience. The improvements described include the capability of the overall system to recognize that an error has occurred while attempting to fulfill a request that was submitted as part of a recognized spoken utterance. Instead of simply doing nothing, or of playing a message to the customer to try again later, the system would now let the user know it was still processing the request while making another attempt at fulfilling the request. This requires the system to retain the entire utterance until it is determined that the request has been fulfilled or that the request cannot be fulfilled, so that the customer does not have to repeat the request a second (or third) time. The feedback to the customer can be audio, visual, or a combination. For example, the Echo could play an audio message "please stand by, I'm still working on your request" while at the same time, the colored ring could turn green to indicate all is well and processing is continuing.

22 Claims, 9 Drawing Sheets

(51) Int. Cl.
  *G10L 15/18* (2013.01)
  *G06F 3/16* (2006.01)
  *G06Q 30/02* (2012.01)
  *G10L 15/26* (2006.01)
  *H04M 3/493* (2006.01)

(52) U.S. Cl.
  CPC .......... *G10L 15/1822* (2013.01); *G10L 15/22* (2013.01); *G10L 15/26* (2013.01); *H04M 3/4936* (2013.01); *G10L 2015/225* (2013.01)

(58) Field of Classification Search
  USPC ........................................................ 704/275
  See application file for complete search history.

(56) References Cited

U.S. PATENT DOCUMENTS

| | | | | |
|---|---|---|---|---|
| 9,350,601 | B2* | 5/2016 | Jain | H04L 69/40 |
| 9,513,961 | B1* | 12/2016 | Hendriks | G06F 9/5011 |
| 9,966,065 | B2* | 5/2018 | Gruber | G10L 15/1822 |
| 10,089,072 | B2* | 10/2018 | Piersol | G10L 15/30 |
| 10,275,651 | B2* | 4/2019 | Badr | G06F 16/5854 |
| 2005/0176418 | A1* | 8/2005 | Leib | H04W 24/00 455/423 |
| 2013/0073293 | A1* | 3/2013 | Jang | G10L 15/22 704/275 |
| 2013/0144858 | A1* | 6/2013 | Lin | G06F 16/951 707/709 |
| 2014/0278413 | A1* | 9/2014 | Pitschel | G10L 15/22 704/243 |
| 2015/0382047 | A1* | 12/2015 | Van Os | G09C 1/00 725/38 |
| 2016/0140960 | A1* | 5/2016 | Chae | G10L 15/22 704/275 |
| 2016/0180853 | A1* | 6/2016 | VanLund | G10L 17/22 704/275 |
| 2016/0203002 | A1* | 7/2016 | Kannan | G10L 15/1822 715/708 |
| 2017/0178626 | A1* | 6/2017 | Gruber | H04M 1/72563 |
| 2018/0040324 | A1* | 2/2018 | Wilberding | H05B 47/10 |
| 2018/0190274 | A1* | 7/2018 | Kirazci | G10L 15/1815 |
| 2018/0204569 | A1* | 7/2018 | Nadkar | G10L 15/22 |
| 2018/0308483 | A1* | 10/2018 | Myoung | G10L 13/00 |
| 2018/0366116 | A1* | 12/2018 | Nicholson | G10L 15/22 |

OTHER PUBLICATIONS

International Preliminary Report on Patentability dated Mar. 10, 2020 in PCT/US2018/049690.

\* cited by examiner

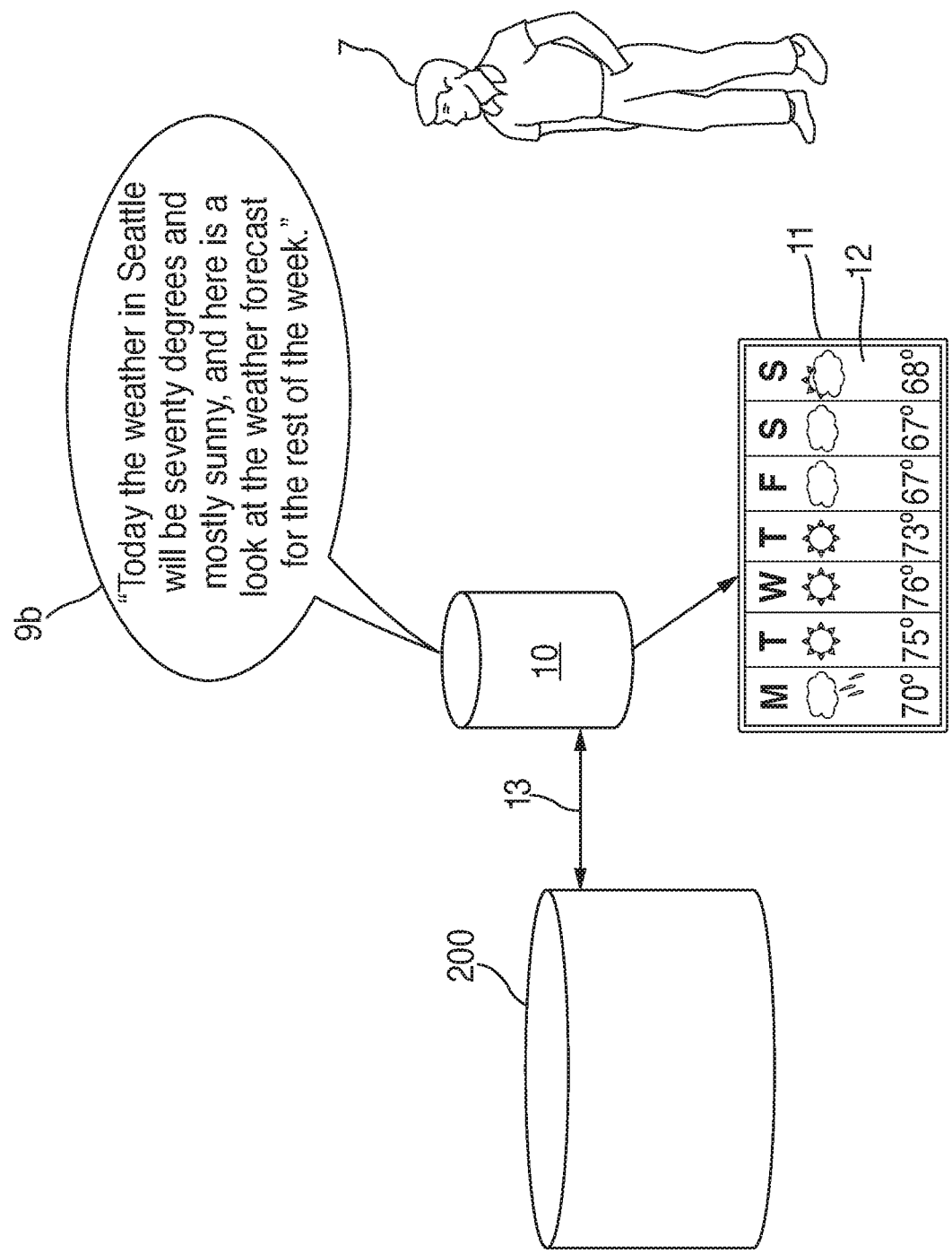

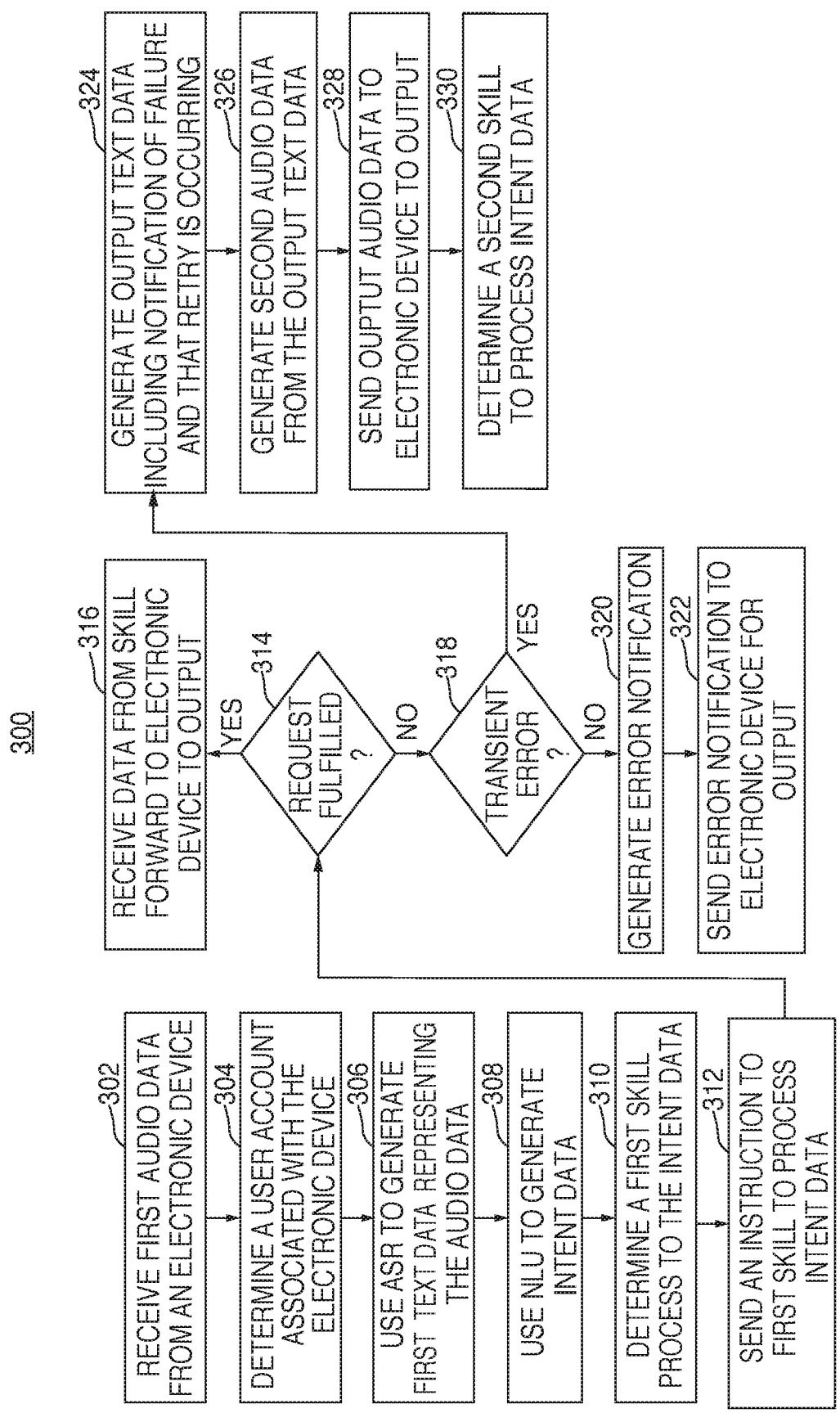

SYSTEMS AND METHODS FOR ENHANCING USER EXPERIENCE BY COMMUNICATING TRANSIENT ERRORS

BACKGROUND

Electronic devices, such as voice-controlled electronic devices, are capable of performing various functions. For instance, an individual may speak a command to activate such a device and in response, the device may perform various functions and/or cause one or more actions to be performed. Some voice-controlled electronic devices may also include display screens capable of outputting content.

BRIEF DESCRIPTION OF THE DRAWINGS

FIGS. 1D and 1E are illustrative diagrams of yet other devices for communicating with a language processing system to provide a response to an individual's request, in accordance with various embodiments;

FIG. 3 is an illustrative flowchart of a process for attempting to fulfill a request in accordance with various embodiments.

DETAILED DESCRIPTION

Figure 1A:
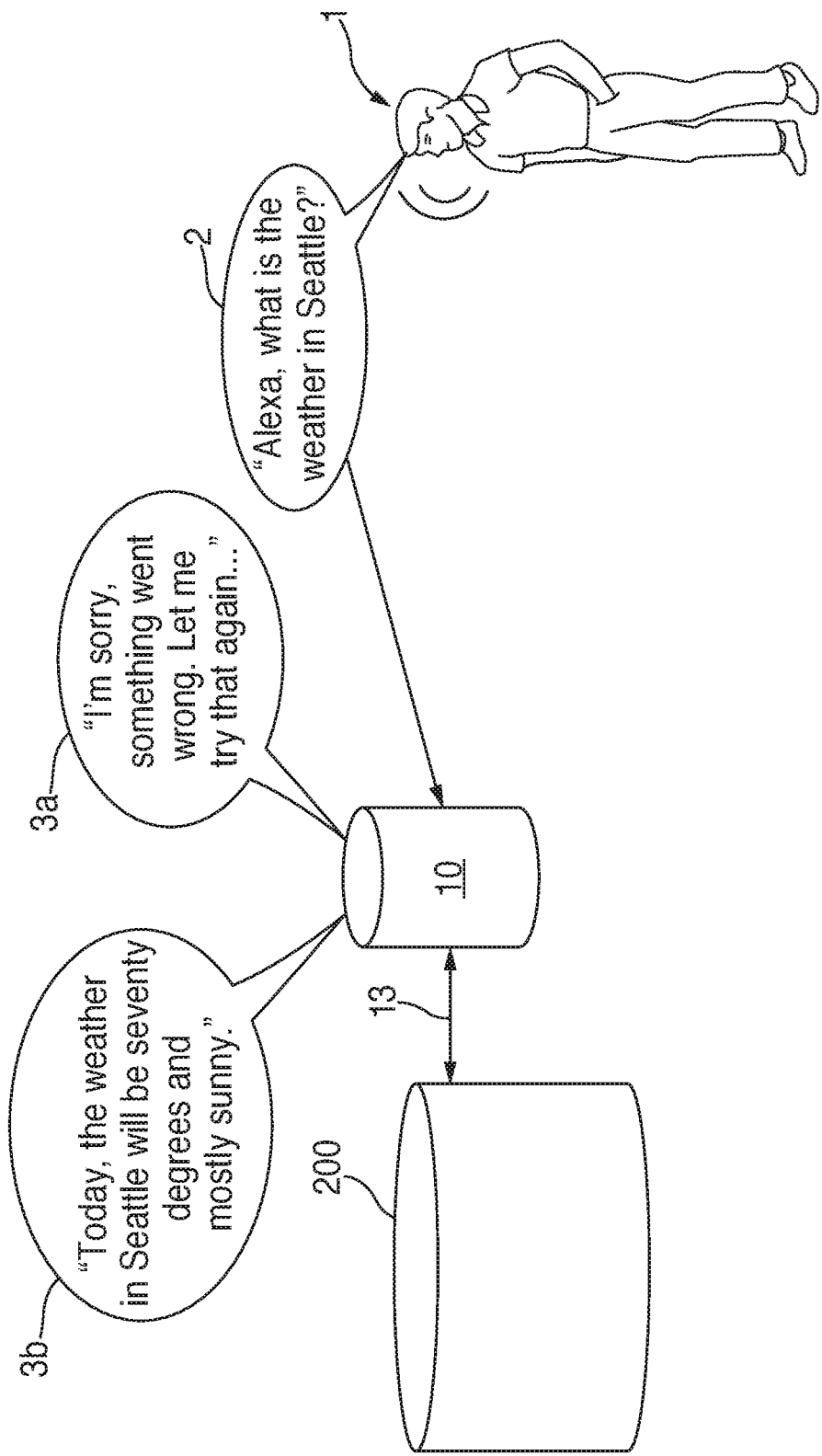
FIG. 1A is an illustrative diagram of a device for communicating with a language processing system to provide a response to an individual's request, in accordance with various embodiments.

The present disclosure, as set forth below, is generally directed to various embodiments of systems, methods and devices related to improving the user experience by reacting to transient errors that may occur while attempting to respond to a request from an individual by communicating to the individual the existence of those errors while making repeated attempts to fulfill the request. Devices like Amazon's Echo are increasingly used by individuals for, among other things, quick and easy access to remotely stored information. Current system architectures, however, typically respond to errors that can occur while attempting to fulfill a request by either not responding at all, or by telling the individual to try again later (or similar message), without any attempt to resolve the issues surrounding the inability to fulfill the request. Under these circumstances, if the individual wants the request fulfilled, the individual would have to try again or simply seek out another source, either of which can lead to frustration for the individual and a less than satisfying user experience. Through innovation, new technical solutions are provided herein that can be used to enhance the user experience by communicating transient errors to an individual (e.g., to let the individual know a response still may be coming, but to stand by) while attempting again to fulfill the request that was made by the individual that led to the error.

The devices and systems described below can provide a more conversational exchange with an individual while responding to the individual's request. For example, in response to an individual's request for a weather forecast, the system can begin an attempt to provide a weather forecast to the individual. In some embodiments, if the system determines that the attempt was not successful, the system can communicate to the individual that it's having trouble providing the weather forecast, let the individual know it's still working on the request, all while trying again to provide the requested weather forecast. This can allow the individual not only to receive the weather forecast without having to ask again, but it can also reduce negative effects repeated requests can have on the overall system (e.g., confusion by the individual as to whether the system is still working on the request, etc.; multiple messages being sent from the device to the language processing system for the same request; etc.), all of which may occur without any communication to the individual that the initial attempt to fulfill the request was not successful.

The system can also provide conversational exchanges with the individual while it seeks alternative methods for responding to the individual's request. For example, in response to an individual's request to play "Song 1," the system can begin an attempt to play Song 1 on a voice-activated electronic device for the individual. The system may, for example, determine a first choice for a particular application (which may alternatively be referred to herein as a functionality, or, more precisely, a feature, program, skill, subset of a domain, etc., which will be described in further detail below), or other module that is capable of playing music from a database. If Song 1 is not found in the database of the first choice, the system can communicate to the individual that it is having trouble locating Song 1, and that it is still searching for Song 1. In the meantime, the system may continue searching for Song 1 in an alternative application, program, skill, subset of the domain, or other module that is capable of playing music from a database until it locates a file from which Song 1 can be played for the individual's enjoyment. Once the system locates Song 1, the system may send Song 1 to the electronic device for playback. By communicating with the individual while searching for an alternative way to play Song 1, the system is able to ultimately fulfill the individual's request without leaving the individual wondering what, if anything, might be happening in response to the individual's request, thus enhancing the user experience.

In another illustrative example, an individual may wish to order a pizza. Thus, the individual may say to a voice-controlled electronic device, "Order a pizza." The device passes the request to a language processing system. The system, in this example, may associate a request to place a pizza order with a user account associated with the electronic device, as well as a "first choice" restaurant associated with the user account. However, for any number of reasons, the first choice restaurant may be unavailable to process the order. For instance, the first choice restaurant may be experiencing heavy online visitor volume, and thus the website may be down. As another example, the first choice restaurant may be closed. In various other exemplary embodiments, the first choice restaurant may indicate that it is incapable to processing the request for any other reasons, or it may simply not respond. Accordingly, the system may determine an alternative restaurant capable of fulfilling the request by processing the order (e.g., a different franchise belonging to the pizza company that the pizza restaurant operates under, a restaurant of comparable value and quality within a given radius of the individual or first choice restaurant, etc.). After causing the electronic device to output a notification that the first choice restaurant is incapable of fulfilling the request (and, in some embodiments, confirming that the alternative restaurant is acceptable), the system may then send instructions to the alternative restaurant to process the order, fulfilling the request.

In some embodiments, the system may communicate that it is still attempting to fulfill the individual's request through visual cues in addition to, or instead of, audio cues. For example, some devices, such as the Amazon Echo and the Amazon Echo Show, can include circuitry capable of causing visual cues to be displayed on a display screen of the Show (or on a display screen of a separate device via a network connection), or, in the case of the Echo, the colored ring could change to a different color to indicate that it is still working on fulfilling the request. As such, in some embodiments, the system may generate audio and/or visual communications to be output by the electrical device upon the occurrence of an unsuccessful attempt to fulfill an uttered request.

In some embodiments, the system may communicate unsuccessful attempts to fulfill an uttered request through various methods. For instance, some devices, such as the Amazon Echo, are associated with user accounts. As such, an individual may select how the system communicates to that individual that an unsuccessful attempt occurred, but that the system is still trying to fulfill the request. For example, in some embodiments, the individual may select one or more video clips, images, series of images, audio clips, musical compositions, or other forms of communication from which the system may generate communications through an electrical device. As such, the system may provide personalized communications to an individual upon the occurrence of an unsuccessful attempt to fulfill the individual's request while the system makes additional attempts to fulfill the request.

In various embodiments, the system may determine that at attempt to fulfill a request was unsuccessful at any time during the fulfillment process. For instance, in some embodiments, an unsuccessful attempt to fulfill a request may be detected while utilizing automatic speech recognition (ASR) or natural language understanding (NLU) processing to convert audio data into text data and determine a subject associated with a request. In some embodiments, an unsuccessful attempt to fulfill a request may be detected while an NLU module is determining which domain may be appropriate to try to fulfill the request. In some embodiments, the system may, using a timer, set a period for determining that various steps should occur within particular time intervals. As such, if the system detects, for instance, that a process for responding to an individual's request might take too long, such as when heavy network traffic can cause a slowdown in system responsiveness, the system can generate an appropriate communication to be output by the electronic device to let the individual know the system is still working on the request. Alternatively, if the system detects, for instance, that a process for responding to an individual's request might take too long, the system can generate an appropriate communication to be output by the electronic device to let the individual know that the system cannot respond to the request, or that it is still working on the request. This may improve the user experience by preventing the user from waiting without knowing whether the system is still working on the request (which could lead to frustration or the user making duplicate requests that could further exacerbate a heavy load condition). In the event that, due to one or more reasons, the system is unable to fulfill the request after a given amount of time (for example, 2 minutes), the system can terminate the request and provide the user with a notification that the attempt to fulfill the request was terminated by sending an appropriate message to be played back on the device.

Thus, the system can determine whether such transient errors occurred at various instances during the fulfillment process, and components within the systems, methods, and devices disclosed herein, may be utilized to keep the individual informed as to the status of the request while it is being fulfilled, embodiments of which are described in further detail below.

FIG. 1A is an illustrative diagram of a device for communicating with a language processing system to provide a response to an individual's request, in accordance with various embodiments. In some embodiments, individual 1 may utter request 2 to a voice-controlled electronic device 10 (such as an Amazon Echo) is located, as described in greater detail below. Request 2 may be any question, inquiry, instruction, phrase, or other set of one or more words/sounds. For example, individual 1 may say, "Alexa, what is the weather in Seattle?" However, alternative or additional requests to ask the same question may include, but are not limited to, "What is today's weather, Alexa?" or "How is the weather today in Seattle, Alexa?" In each instance, "Alexa" has a special connotation in that it may be referred to as a wakeword, or activation word (the wakeword would be a different word, or a particular phoneme or a particular sound, such as the sound made by clapping or snapping your fingers). In particular, a wakeword may be detected within an audio signal detected by one or more microphones located on device 10. In some embodiments, however, the one or more microphones may alternatively be located on a separate device in communication with device 10, such as a wireless microphone that can communicate with device 10 through any of a variety of different protocols, such as Bluetooth, Wi-Fi, etc. In some embodiments, after the wakeword is detected, voice-controlled electronic device 10 may begin interpreting/analyzing audio until no more speech is detected by the audio input device(s). In other embodiments, once the wakeword is detected, device 10 can open a network connection (e.g., channel 13) to a language processing system (such as language processing system 200 shown in FIG. 2A), in which case device 10 would send received audio to the system for further processing.

In general, device 10 constantly listens for the wakeword and is otherwise inactive. Once the wakeword is recognized, device 10 may switch from a passive mode to an active mode. It should be noted that the wakeword does not have to be the first word or sound in a given sentence or request. Device 10 can be configured such that it can record and store a limited amount of audio data that should, in most instances, be the amount of time needed to speak a sentence or more. Accordingly, even if a wakeword is recognized in the middle or end of a sentence, device 10 may have retained the entire sentence, which can then be analyzed by the language processing systems to determine what is being requested.

Device 10 may become active and receive request 2 from individual 1 in the form of spoken words that are recorded and converted to a digital representation (e.g., MP3 data). In accordance with various embodiments disclosed herein, the contents of the digital representation are essentially streamed to language processing system 200 via channel 13 such that at least a portion of the digital representation can be received by language processing system 200 and analysis can begin on that portion and any subsequent portions immediately upon receipt. In particular, language processing system 200 can embark on processing one or more portions of the digital representation prior to the user having completed making the request for information. Thus, language processing system 200 can start analyzing whatever portion of the digital representation it received through a variety of processes such as ASR and NLU processing to convert the digital representation into a series of identifiable words, and then to analyze those words in order to interpret the meaning of the request from individual 1. Language processing system 200 may utilize ASR processing to recognize the spoken words that were recorded and stored in the MP3 data and to translate them into known text that can then be analyzed by NLU processing to attempt to decipher the meaning of the request from individual 1.

Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio data to reduce or minimize extraneous noise, however this is not required.

Language processing system 200 can include multiple instances of processors, storage/memory, and communications circuitry, each of which may be utilized in connection with one or more servers as is described in more detail below. Language processing system 200 may operate to analyze the incoming request for information in order to determine what is being requested, and then may either gather the requested information internally and/or access a third party skill to retrieve the information.

As illustrated in FIG. 1A, for example, an individual 1 can say "Alexa, what is the weather in Seattle?" The audio signal of the spoken words, which include request 2, are received by one or more microphones within device 10 (or remote microphones coupled to device 10 to provide device 10 with the signals that are received by the remote microphones), and are converted to digital representations, such as digital audio data, and uploaded to language processing system 200 via channel 13. Once language processing system 200 receives the audio data, language processing system 200 uses ASR processing to convert the audio data into text data. Then, language processing system 200 uses NLU processing to determine meaning of the text data, such as that the subject or topic of request 2 is the weather.

In the example shown in the figures and described herein, once the subject has been determined, language processing system 200 may determine an appropriate functionality for fulfilling request 2 (e.g., an internal program or database, a third party skill, etc.). Language processing system 200 may then utilize the functionality to fulfill the request. The functionality may fulfill the request by, for example, retrieving the data necessary to fulfill the request through language processing system 200. However, in some embodiments, the functionality may not be capable of fulfilling the request at that time due to any number of a variety of issues. For example, a network error may prevent the skill from providing the information needed for the response to language processing system 200. Once language processing system 200 determines that request 2 was not fulfilled for whatever reason, language processing system 200 may generate and send audio data to device 10 via channel 13 such that device 10 outputs an audio signal representing that audio data.

Thus, once language processing system 200 determines that request 2 was not fulfilled by the appropriate functionality, a response can be generated and synthesized into audio data (via, for example, techniques such as text-to-speech (TTS)), and transmitted to device 10 via channel 13 so that the response to request 4 may be output on one or more speakers. Accordingly, as shown in FIG. 1A, one or more speakers on device 10 can output an audio signal 3a corresponding to the audio data received from language processing system 200, such as "I'm sorry, something went wrong. Let me try that again." Meanwhile, language processing system 200 can retry communicating with the appropriate functionality to fulfill the original request 2.

In some embodiments, language processing system 200 can retry communicating with the functionality to fulfill the original request 2 at substantially the same time that device 10 is outputting audio signal 3a. This allows language processing system 200 to quickly (e.g., without a long, awkward silence that may typically occur during processing) retrieve data necessary from the appropriate functionality to fulfill the request, and forward that data to device 10 via channel 13 such that device 10 outputs audio signal 3b through one or more speakers. Audio signal 3b may correspond to the data provided originally by the appropriate functionality to fulfill request 2 by including such information as "Today, the weather in Seattle will be seventy degrees and mostly sunny." In this manner, individual 1: (i) ends up getting the information that was requested; (ii) does not have to make the request a second time event though an error occurred during the initial process of fulfilling the request; and (iii) is kept informed on the status of the fulfillment process.

Digital audio data (e.g., MP3, MPEG, etc., formatted data) may be transmitted over a network (e.g., channel 13), such as the Internet, to and from language processing system 200 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between device 10 and language processing system 200. In some embodiments, device 10 and language processing system 200 may communicate with one another via a web browser using HTTP. Various additional communication protocols may be used to facilitate communications between voice-controlled electronic device 10 and language processing system 200 including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Figure 1B:
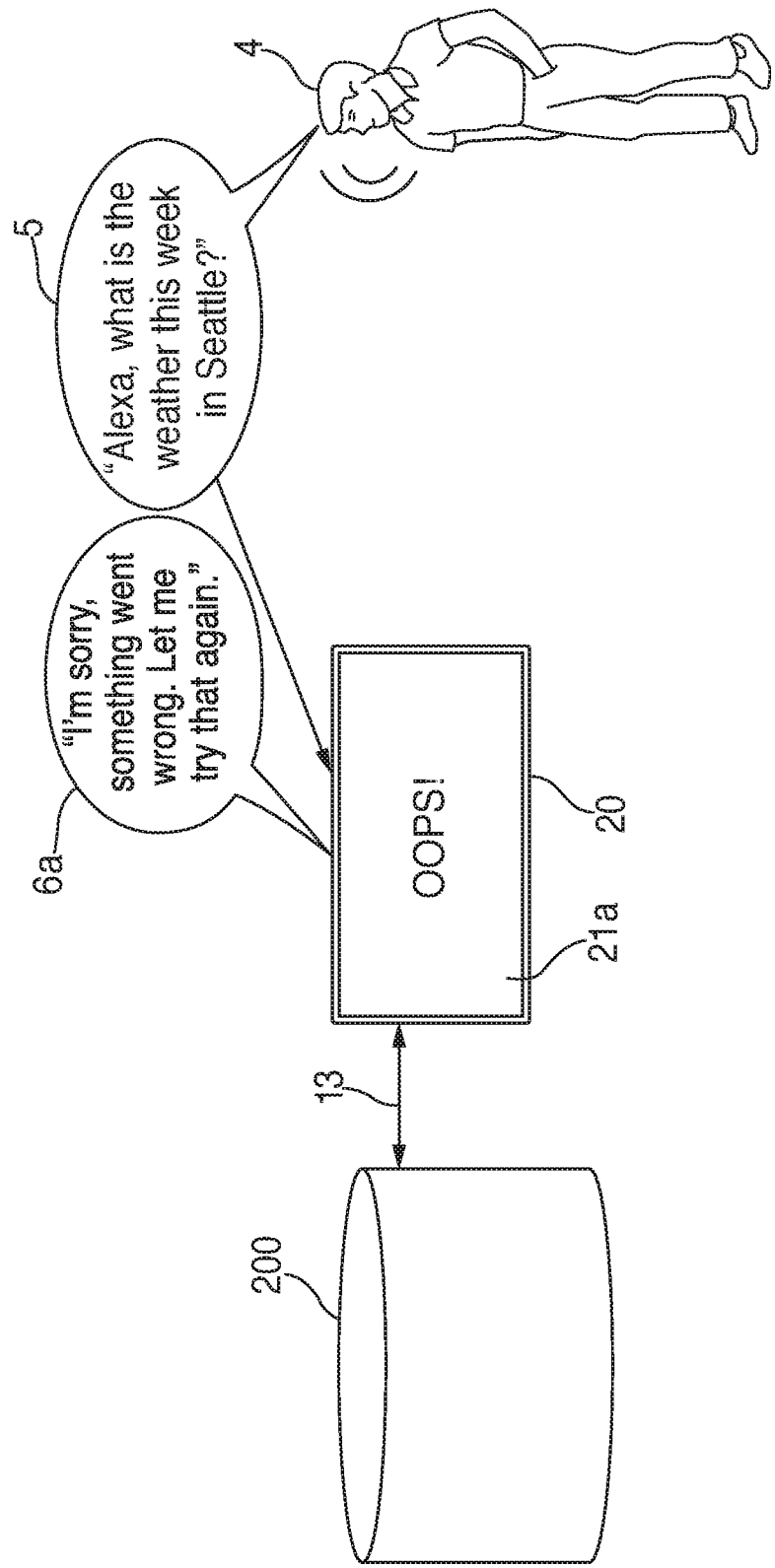
FIGS. 1B and 1C are another illustrative diagrams of another device for communicating with a language processing system to provide a response to an individual's request, in accordance with various embodiments.
Figure 1C:
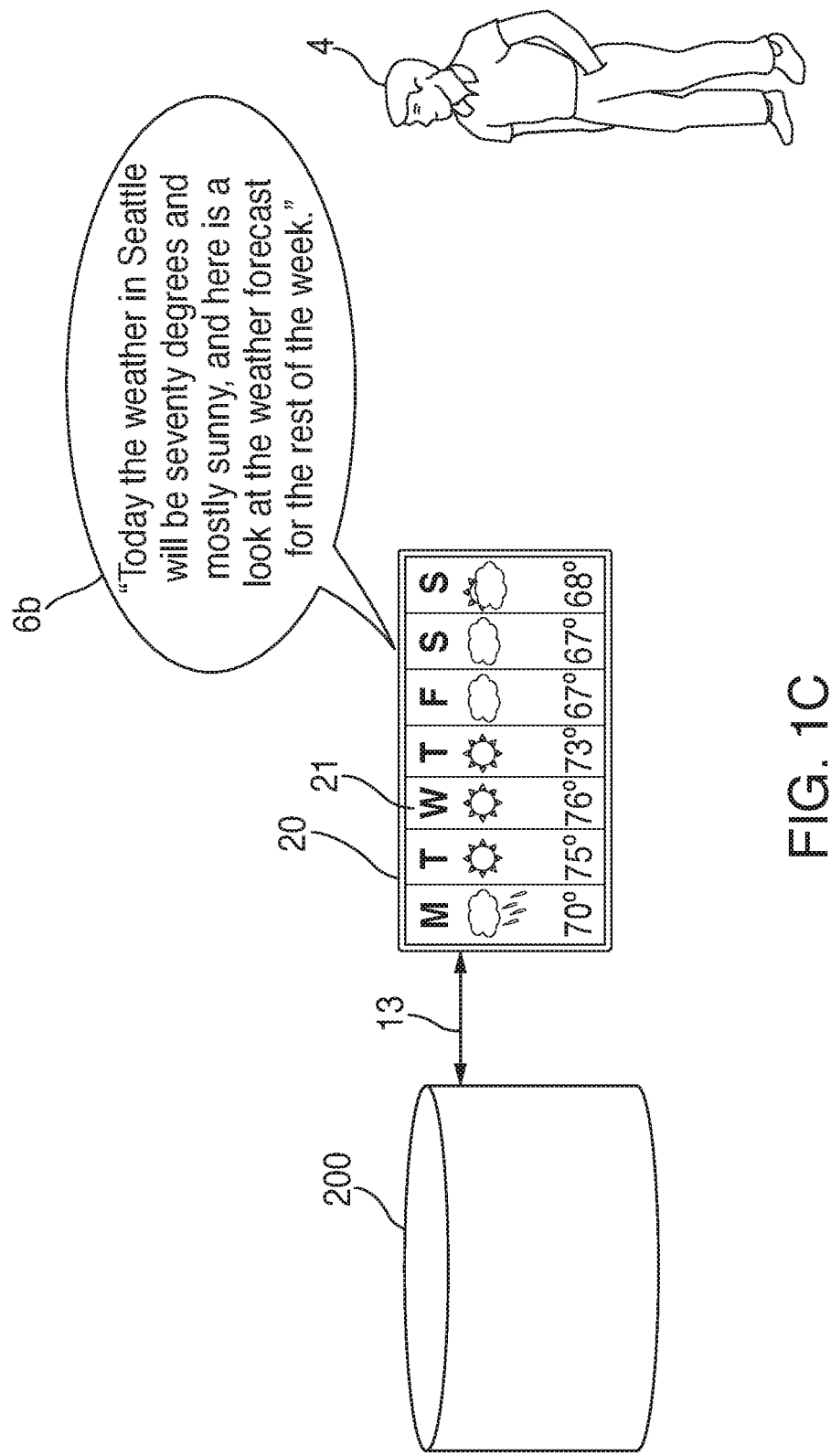

FIGS. 1B and 1C are additional illustrative diagrams of device for communicating with a language processing system to provide a response to an individual's request, in accordance with various embodiments. In some embodiments, an individual 4 may say, "Alexa, what is the weather this week in Seattle?" to a voice-controlled electronic device 20 (such as an Amazon Echo Show). This utterance from individual 4 may include request 5. Similar to electronic device 10 in FIG. 1A, device 20 may detect "Alexa" as the wakeword and enter into an active state (and, as previously described, the audio signals may instead be capture by one or more remote microphones, such as wireless microphones). Device 20 can accept the entire audio signal of request 5 and convert it into digital audio data, which may be sent to language processing system 200 through a network, such as channel 13 or network 230 shown in FIG. 2A. Similar to FIG. 1A, language processing system 200 may use ASR processing to generate text data from the audio data received from device 20. Language processing system 200 may then use NLU processing to determine the subject of request 5, which may allow language processing system 200 to then determine an appropriate functionality needed to fulfill request 5. Language processing system 200 may then coordinate the resources and functionalities it needs to fulfill the request (for example, the resources may all be resident within system 200, or additional resources may need to be obtained from third party sources through a skill or by accessing a different domain). In some embodiments, in response to communicating with the functionality, language processing system 200 may receive data necessary to fulfill request 5 from the functionality. Once the request has been processed, language processing system 200 can send the appropriate information to device 20 via channel 13 such that device 20 can capable of fulfilling request 5. That information may be an audio signal, or, the information may be a command to a voice-controlled electronic device, or that information may be a video image, or that information may be a combination.

In some embodiments, at any point within the process for responding to the request 5, language processing system 200 may determine that request 5 has not been fulfilled. In response to determining that request 5 has not been fulfilled, language processing system 200 may generate data that includes a notification that request 5 was not fulfilled and that an attempt to retry fulfilling request 5 is being made. Language processing system 200 may cause that data to be sent to device 20 via channel 13 for playback to the individual. In some embodiments, device 20 may include a display screen 21 and one or more speakers, and the notification may include both audio data and visual data. As such, language processing system 200 can send both audio data and visual data to device 20 via channel 13, and device 20 may output the notification as audio signal 6a from one or more speakers located on device 20, and output the notification as visual information on the display screen 21 located on device 20. For example, in some embodiments, display screen 21 may output visual information that displays the word "OOPS!" while one or more speakers output audio data 6a that states "I'm sorry, something went wrong. Let me try that again." In some embodiments, visual information displayed on display screen 21 may be one or more words, one or more images, one or more series of images, a video, or a combination thereof.

In some embodiments, while device 20 is outputting the notification, language processing system 200 may make another attempt at fulfilling the original request 5. In some embodiments, language processing system 200 can retry to fulfill the request itself, in other embodiments, language processing system 200 can communicate with the appropriate functionality to obtain the information needed to fulfill the original request 5 at substantially the same time that device 20 is outputting audio signal 6a from one or more speakers and visual information via display screen 21. This allows language processing system 200 to quickly (and without a long, awkward silence) retrieve the data necessary to fulfill the request in an efficient manner. In some embodiments, such as the system shown in FIG. 1C, language processing system 200 may forward that data to device 20 such that device 20 outputs audio signal 6b and/or visual data (e.g., visual data 21b) via a display screen that fulfills request 5, such as by outputting an image providing a breakdown of the weather forecast for the week via a display screen and audio data 6b via one or more speakers. For example, the speaker(s) might output: "Today the weather in Seattle will be seventy degrees and mostly sunny, and here is a look at the weather forecast for the rest of the week," while the display shows the upcoming weekly forecast.

The digital audio data (e.g., MP3, MPEG, etc., formatted data) may be transmitted over a network (e.g., channel 13), such as the Internet, to language processing system 200 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between device 20 and language processing system 200. In some embodiments, device 20 and language processing system 200 may communicate with one another via a web browser using HTTP. Various additional communication protocols may be used to facilitate communications between device 20 and language processing system 200 including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Figure 1D:
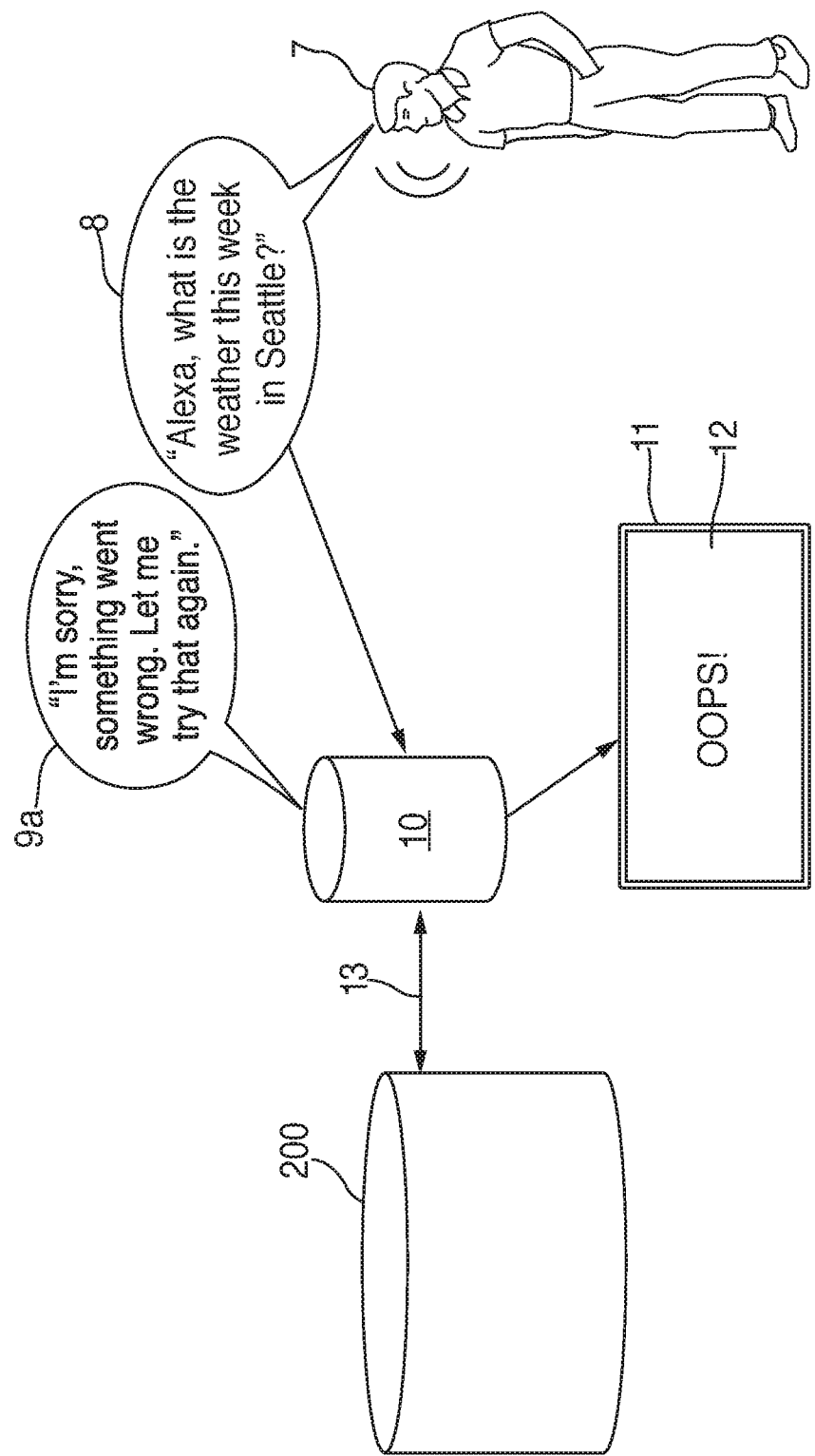

FIGS. 1D and 1E are illustrative diagrams of yet other devices for communicating with a language processing system to provide a response to an individual's request, in accordance with various embodiments. In one exemplary, non-limiting embodiment, an individual 7 may utter an audio signal that includes request 8 to a voice-controlled electronic device 10, such as the electronic device 10 depicted in FIG. 1A. Similar to FIG. 1A, device 10 in FIG. 1E may detect "Alexa" from request 8 as the wakeword and enter into an active state. Device 10 may then accept the rest of the audio signal that is representative of request 8 and convert it into audio data, which can be sent to language processing system 200 via channel 13. Language processing system 200 may then use ASR processing to generate text data from the audio data received from device 10. Language processing system 200 may then use NLU processing to place the text data into a context in order to determine the subject of request 8. Language processing system 200 can then determine an appropriate functionality in attempting to fulfill request 8. For example, language processing system 200 may need to communicate with functionalities such as a third party skill in order to fulfill the request. In other instances, language processing system 200 may have all of the data necessary to fulfill request 8 via internal functionalities. Once it is determined how to fulfill the request, language processing system 200 may prepare the appropriate information to fulfill the request and forward that information to device 10 such that device 10 fulfills request 8. In some instances, device 10 can fulfill request 8 by outputting an audio signal indicating, for example, the week's weather forecast and sending instructions to display screen 11 to output visual information indicating the week's weather forecast. However, in some embodiments, language processing system 200 may determine that the request has not been fulfilled for whatever reason. In response to determining that the request has not been fulfilled, language processing system 200 may generate data that includes a notification for the individual that the request was not fulfilled and that an attempt to retry fulfilling the request is being made. Language processing system 200 may then send that data to device 10 via channel 13 such that device 10 outputs an audio signal that includes the notification to the individual. In some embodiments, the notification can include both audio data and visual data. As such, language processing system 200 can send both audio data and visual data to device 10, in which case device 10 can output the audio portion of the notification as audio signal 9a from one or more speakers located on (or otherwise coupled to, for instance, via a network connection), and device 10 can send the visual portion to display screen 11 to be output such as visual content 12a. In some embodiments, language processing system may instead directly send the visual content to display screen 11. In various embodiments, visual information 12a may be in the form of one or more words, one or more images, one or more series of images, a video, or a combination thereof.

Meanwhile, in some embodiments, language processing system 200 may initiate another attempt at fulfilling the original request 8. In some embodiments, language processing system 200 may, when appropriate, make additional attempts at communicating with a functionality to acquire the information needed to fulfill original request 8 at substantially the same time that device 10 and display screen 11 are outputting the notification to the individual via audio signal 9a and visual information 12a. This can provide language processing system 200 with time to retrieve data necessary to fulfill the request without the individual having to wait and wonder what is happening while system 200 retries the request. For instance, in some embodiments, such as the system displayed in FIG. 1E, system 200 can send information to device 10 which may include instructions to communicate with display screen 11 such that screen 11 displays visual information 12b (which may, for example, be a breakdown of the weather forecast for the upcoming week), while device 10 itself outputs audio signal 9b stating: "Today the weather in Seattle will be sixty-eight degrees and mostly sunny, and here is a look at the weather forecast for the rest of the week."

Digital audio data (e.g., MP3, MPEG, etc., formatted data) may be transmitted over a network (e.g., channel 13), such as the Internet, to and from language processing system 200 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between device 10 and language processing system 200. In some embodiments, device 10 and language processing system 200 may communicate with one another via a web browser using HTTP. Various additional communication protocols may be used to facilitate communications between voice-controlled electronic device 10 and language processing system 200 including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Figure 2A:
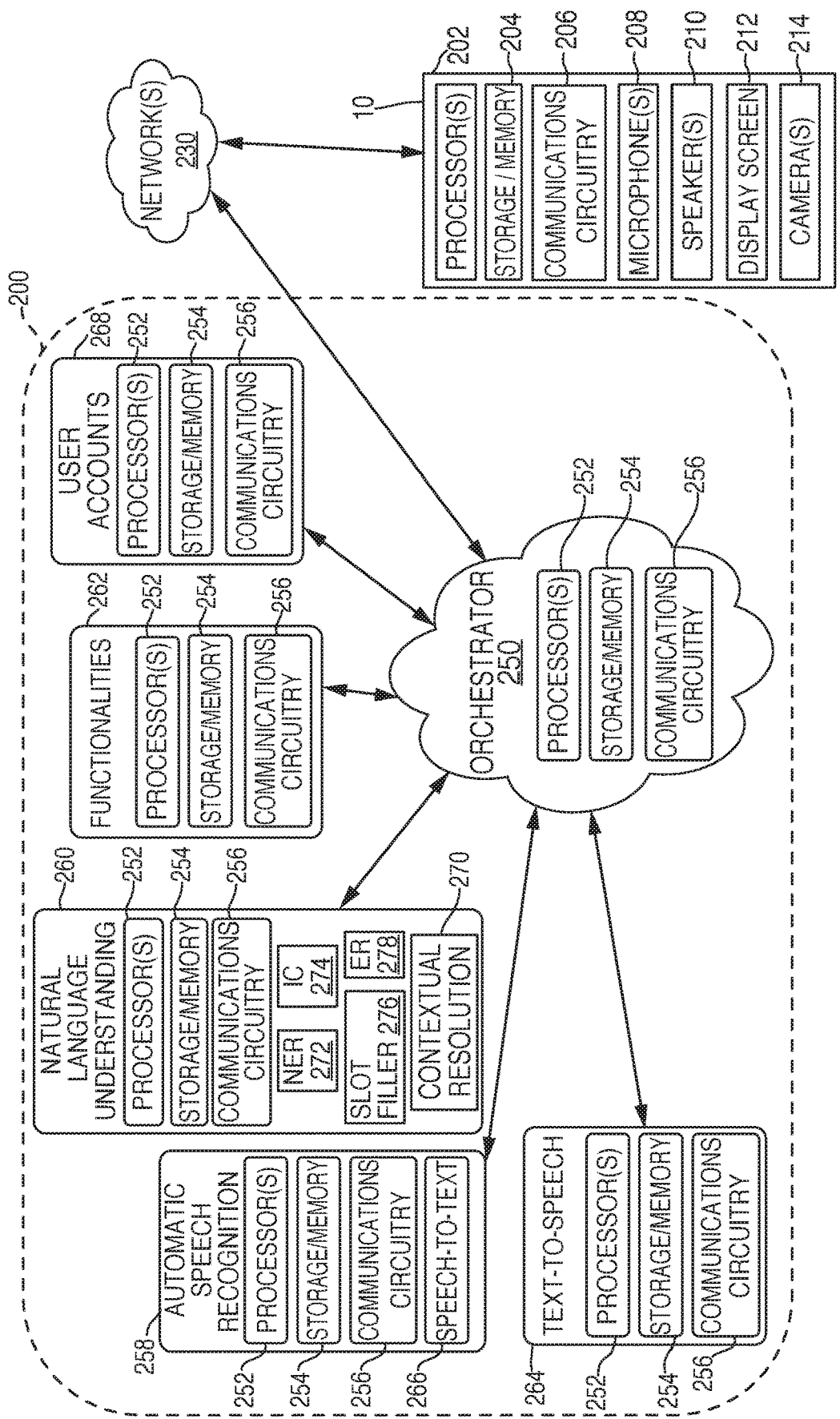
FIG. 2A is an illustrative diagram of an illustrative system architecture of the language processing system and exemplary devices of FIGS. 1A-1E, in accordance with various embodiments.

FIG. 2A is an illustrative diagram of the system architecture of language processing system that was discussed in connection with FIGS. 1A-1E (and shown in a simpler form for clarity in those figures), in accordance with various embodiments. Electronic device 10 may, in some embodiments, include sound controlled functionality, such as one or more voice and/or sound activated components. In some embodiments, electronic device 10 may be configured to communicate with speech-processing system 200 in response to detecting an utterance including a wakeword, which may subsequently be followed by a request/question/statement. Similarly, electronic device 10 may alternatively or additionally include one or more manually activated components for manually activating electronic device 10. In this particular scenario, electronic device 10 may also be configured, in one embodiment, to communicate with speech-processing system 200 in response to a manual input being detected by one or more input mechanisms, such as a touch screen, a button, and/or a switch, for example.

In a non-limiting embodiment, electronic device 10 may be capable of being activated in response to detecting a specific sound, such as a wakeword, as well as, or alternatively, via one or more inputs. After detecting a specific sound (e.g., a wakeword or trigger expression), electronic device 10 may recognize commands (e.g., audible commands, inputs) within captured audio, and may perform one or more actions in response to the received commands. Furthermore, electronic device 10 may also be configured to perform one or more actions in response to detecting a particular touch, or mechanical, input(s) via electronic device 10.

Electronic device 10 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 10 may be relatively simple or basic in structure such that no, or a minimal number of, mechanical input option(s) (e.g., keyboard, mouse, track pad) or touch input(s) (e.g., touch screen, buttons) are included. For example, electronic device 10 may be able to receive and output audio, and may include power, processing capabilities, storage/memory capabilities, and communication capabilities. However, in other embodiments, electronic device 10 may include one or more components for receiving mechanical inputs or touch inputs, such as a touch screen and/or one or more buttons.

Electronic device 10, in one embodiment, may include a minimal number of input mechanisms (e.g., a power on/off switch) such that functionality of electronic device 10 may solely or primarily be through audio input and audio output. For example, electronic device 10 may include, or be in communication with, one or more microphones that listen for a wakeword by continually monitoring local audio. In response to the wakeword being detected, electronic device 10 may establish a connection with speech-processing system 200, send audio data to speech-processing system 200, and await/receive a response from speech-processing system 200. In some embodiments, however, non-voice/sound activated devices may also communicate with speech-processing system 200. For example, in response to a button or touch screen being pressed, or a button or touch screen being pressed and held, a microphone associated with electronic device 10 may begin recording local audio, establish a connection with speech-processing system 200, send audio data representing the captured audio to speech-processing system 200, and await/receive a response and/or action to occur from speech-processing system 200.

Persons of ordinary skill in the art will recognize that speech-processing system 200 may be located within a dedicated computing device or computing system, which may or may not be in communication with one or more additional devices. For instance, speech-processing system 200 may be located on a remote computing system with which an individual subscribes to a service on. However, speech-processing system 200 may also be included within a computing system locally stored or owned by an individual.

Electronic device 10 may include one or more processors 202, storage/memory 204, communications circuitry 206, one or more microphones 208 or other audio input devices (e.g., transducers), one or more speakers 210 or other audio output devices, a display screen 212 (such as, the display screen of device 20 in FIGS. 1B and 1C), and one or more cameras 214 or other image capturing components. However, one or more additional components may be included within electronic device 10, and/or one or more components may be omitted. For example, electronic device 10 may also include a power supply or a bus connector. As still yet another example, electronic device 10 may include one or more additional input and/or output mechanisms, such as one or more buttons, or one or more switches or knobs. Furthermore, while electronic device 10 may include multiple instances of one or more components, for simplicity only one of each component has been shown.

In some embodiments, electronic device 10 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 10 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 10 may include one or more microphone(s) 208. These microphone(s) 208 may receive audio input signals, and electronic device 10 may determine whether or not the audio input signals indicate that a wakeword was uttered. If so, then electronic device may cause audio data representing an utterance including the wakeword, or spoken after the wakeword to be sent to speech-processing system 200.

Processor(s) 202 may include any suitable processing circuitry capable of controlling operations and functionality of electronic device 10, as well as facilitating communications between various components within electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 10, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 10.

Storage/memory 204 may include one or more types of storage mediums such as any volatile or non-volatile memory, or any removable or non-removable memory implemented in any suitable manner to store data for electronic device 10. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic device 10 and speech-processing system 200. For example, the media system may store one or more communications protocols that may be executed by processor(s) 202 for facilitating communications for electronic device 10. In some embodiments, a sessions initiation protocol ("SIP") may be used to facilitate media transfer between electronic device 10 and one or more of speech-processing system 200 and another electronic device. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 10. In some embodiments, a Web Real-Time Communications ("WebRTC") protocols may be employed by electronic device 10. In a non-limiting embodiment, the media system may include instructions that indicate which communications protocols to employ for facilitating media transfer between devices based on a device type of electronic device 10. For example, if electronic device 10 does not include display 212 and/or camera 214, then the media system may indicate that PJSIP should be used, whereas if electronic device 10 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an ASR component that recognizes human speech in detected audio. The speech recognition system may also include an NLU component that determines user intent based on the detected audio. Also included within the speech recognition system may be a TTS component capable of converting text to speech to be outputted by speaker(s) 210, and/or a speech-to-text ("STT") component capable of converting received audio signals into text to be sent to speech-processing system for processing.

The wakeword database may be a database stored locally by storage/memory 204 of electronic device 10, and may include a list of a current wakeword for electronic device 10, as well as one or more previously used, or alternative, wakewords for voice-controlled electronic device. In some embodiments, an individual may set or program a wakeword for their electronic device 10. The wakeword may be programmed directly on electronic device 10, or a wakeword or wakewords may be set by the individual via a local client application that is in communication with speech-processing system 200. For example, an individual may use their mobile device having the speech-processing system application running thereon to set the wakeword. The specific wakeword may then be communicated from the mobile device to speech-processing system 200, which in turn may send/notify electronic device 10 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 10. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR processing. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 10 may then begin transmitting the audio signal to speech-processing system 200 for detecting and responds to subsequent utterances made by an individual.

In some embodiments, storage/memory 204 may store voice biometric data associated with one or more individuals. For example, an individual that operates electronic device 10 may have a registered user account on speech-processing system 200 (e.g., within accounts system 268). In some embodiments, electronic device 10 may be associated with a group account, and various individuals may have user accounts that are operating under the rules and configurations of the group account. As an illustrative example, electronic device 10 may be associated with a first group account on speech-processing system 200, the first group account being for a family that lives at a household where electronic device 10 is located. Each family member may also have a user account that is linked to the first group account (e.g., a parent, a child, etc.), and therefore each user account may obtain some or all of the rights of the first group account. For example, electronic device 10 may have a first group account on speech-processing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Communications circuitry 206 may include any circuitry allowing or enabling one or more components of electronic device 10 to communicate with one another, and/or with one or more additional devices, servers, and/or systems. For example, communications circuitry 206 may facilitate communications between electronic device 10 and speech-processing system 200. As an illustrative example, audio data representing an utterance (e.g., utterance 2 of FIG. 1A) may be transmitted over a network 230, such as the Internet, to speech-processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 10 and speech-processing system 200. In some embodiments, electronic device 10 and speech-processing system 200 may communicate with one another via a web browser using HTTP. Various additional communication protocols may be used to facilitate communications between electronic device 10 and speech-processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 10 may include one or more antennas to facilitate wireless communications with a network using various wireless technologies (e.g., Wi-Fi, Bluetooth, radiofrequency, etc.). In yet another embodiment, electronic device 10 may include one or more universal serial bus ("USB") ports, one or more Ethernet or broadband ports, and/or any other type of hardwire access port so that communications circuitry 206 allows electronic device 10 to communicate with one or more communications networks.

Electronic device 10 may also include one or more microphones 208 and/or transducers. Furthermore, one or more microphones located within a separate device may be in communication with electronic device 10 to capture sounds for electronic device 10. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 10 may include multiple microphones (e.g., four, seven, ten, etc.) placed at various positions about electronic device 10 to monitor/capture any audio outputted in the environment where electronic device 10 is located. The various microphones 208 may include some microphones optimized for distant sounds, while some microphones may be optimized for sounds occurring within a close range of electronic device 10. In some embodiments, microphone(s) 208 may only begin to detect audio signals in response to a manual input to electronic device 10. For example, a manually activated device may begin to capture audio data using microphone(s) 208 in response to a user input, such as pressing a button, tapping a touch screen, or providing any touch input gesture to a touch input component.

Electronic device 10 may include one or more speakers 210. Furthermore, electronic device 10 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 10 may be located. In some embodiments, speaker(s) 210 may include headphones or ear buds, which may be wirelessly wired, or hard-wired, to electronic device 10, that may be capable of broadcasting audio directly to an individual.

In some embodiments, one or more microphones 208 may serve as input devices to receive audio inputs. Electronic device 10, in the previously mentioned embodiment, may then also include one or more speakers 210 to output audible responses. In this manner, electronic device 10 may function solely through speech or audio, without the use or need for any input mechanisms or displays, however this is merely exemplary.

Display screen 212 may correspond to a display device and/or touch screen, which may be any size and/or shape and may be located at any portion of electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 10. For instance, electronic device 10 may not include display screen 212 (such as, for example, the electronic device 10 in FIGS. 1D and 1E). Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may be reduced in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 10 may be configured to determine which pixels are associated with a particular location point, and which item or items are also displayed at that pixel location. Furthermore, electronic device 10 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 10, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, content displayed on display screen 212 may be formatted such that contextual entities and lists can be analyzed by speech-processing system 200 for list resolution and/or anaphora resolution. Context related to the displayed content may include entities associated with electronic device 10 including, but not limited to, foreground entities (e.g., lists of items, detail pages), background entities (e.g., songs, audio books), and notification entities. The contextual metadata may be structured into context entity slots, list metadata, and any other additional data available. For example, contextual entity slots may correspond to data used for list resolution and/or anaphora resolution. The contextual entity slots may be specified in domain definitions with corresponding values. The list metadata may include list identifiers, item identifiers for items of a list, and absolute positions of the list for a particular item (e.g., a first item of a list, a second item of a list, etc.). Such additional data may include unique identifiers associated with an object, item prices, quantities, and the like.

In some embodiments, electronic device 10 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 10 may include multiple cameras 214, such as one or more front-facing cameras and/or one or more rear facing cameras. Furthermore, camera(s) 214 may be configured to recognize far-field imagery (e.g., objects located at a large distance away from electronic device 10) or near-filed imagery (e.g., objected located at a relatively small distance from electronic device 10). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 10. For instance, camera(s) 214 may be external to, and in communication with, electronic device 10. For example, an external camera may be capable of capturing images and/or video, which may then be provided to electronic device 10 for viewing and/or processing.

Persons of ordinary skill in the art will recognize that, in some embodiments, display screen 212 and/or camera(s) 214 may be optional for electronic device 10. For instance, electronic device 10 may function using audio inputs, and outputting audio in response or causing one or more actions to occur in response, and therefore display screen 212 and/or camera(s) 214 may not be included. Furthermore, in some embodiments, electronic device 10 may not include display screen 212 and/or camera(s) 214, but instead may be in communication with display screen 212 and/or camera(s) 214. For example, electronic device 10 may be connected to a display screen via a Wi-Fi (e.g., 802.11 protocol) connection such that visual content sent to electronic device 10 may be sent to the display screen, and output thereby.

In one exemplary embodiment, electronic device 10 may include an additional input/output ("I/O") interface. For example, electronic device 10 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 10 may include one or more lights, light emitting diodes ("LEDs"), or other visual indicator(s). Persons of ordinary skill in the art will recognize that, in some embodiments, one or more features of the output portion of the I/O interface may be included in a purely voice-controlled version of electronic device 10. For example, one or more LED lights may be included on electronic device 10 such that, when microphone(s) 208 receive audio, the one or more LED lights become illuminated signifying that audio has been received by electronic device 10. In some embodiments, one or more vibrating mechanisms or other haptic features may be included with electronic device 10 to provide a haptic response to an individual.

In some embodiments, electronic device 10 may include radio-frequency identification ("RFID") functionality and/or near field communication ("NFC") functionality. Furthermore, in some embodiments, electronic device 10 may include one or more infrared ("IR") sensors and one or more IR emitters. The IR sensors/emitters may be used to determine depth information. For example, in one embodiment, a distance of an individual from electronic device 10 may be determined using the one or more IR sensors/emitters. Depth determination may be performed using any depth determination technique. In some embodiments, a distance between an individual and electronic device 10 may be employed as a basis for presenting content with varying density using display screen 212. In some embodiments, electronic device 10 may include beaconing functionality that allows electronic device 10 to recognize when one or more devices are located nearby. For example, electronic device 10 may include beaconing detection functionality that generates a beaconing signal, and attempts to determine whether any devices nearby are capable of detecting that signal. If so, then that may indicate that a particular device is proximate to electronic device 10.

In some embodiments, contextual metadata may be obtained by computer vision analysis of an object detected by camera(s) 214. For example, in response to speaking the utterance, "Buy this," electronic device 10 may cause camera(s) 214 to capture an image. That image may be analyzed to determine what the object is, and the contextual metadata associated with that objects identify may be determined. For instance, if an individual is holding up a bottle of ketchup, then the computer vision analysis may be able to determine a product name, bar code, and/or any other attribute about the bottle of ketchup from the captured image, and may populate a contextual metadata structure indicating the determined values (e.g., 'Item Name' slot: "Ketchup").

Speech-processing system 200 may include various components and modules including, but not limited to, automatic speech recognition ("ASR") system 258, natural language understanding ("NLU") system 260, functionalities system 262, text-to-speech ("TTS") module 264, and user accounts system 268. In some embodiments, speech-processing system 200 may also include an orchestrator system 250 capable of orchestrating one or more processes to be performed by one or more of ASR system 258, NLU system 260, functionalities system 262, TTS system 264, and/or user accounts system 268, as well as one or more additional components, devices, and/or systems associated therewith. Speech-processing system 200 may also include computer readable media, including, but not limited to, flash memory, random access memory ("RAM"), and/or read-only memory ("ROM"). Speech-processing system 200 may also include various modules that store software, hardware, logic, instructions, and/or commands for speech-processing system 200, such as a speaker identification ("ID") module, or any other module, or any combination thereof.

ASR system 258 may be configured to recognize human speech in detected audio, such as audio captured by electronic device 10, which may then be transmitted to speech-processing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR system 258 may include speech-to-text ("STT") system 266. STT system 266 may employ speech-to-text processing. However, processes for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 200, such as the expression detector mentioned above with regards to electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, functionality/skill enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 10, speech-processing system 200, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories, that may be capable of handling the intent of the utterance. For example, an utterance, "Play this," may be identified by a Music domain, an E-Book domain, and a Video domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with functionalities of system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 10, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., requests 2, 5, and 8 in FIGS. 1A, 1B, and 1D, respectively) as well as the pertinent pieces of information in the text that allow an action to be completed. For example, if a spoken utterance is processed by ASR system 258 and outputs the text, "call mom," NLU system 260 may determine that an intent of the utterance is to activate a telephone, or telephone functionality, and to initiate a call with a contact matching the entity "mom". In some embodiments, NLU system 260 may process several textual inputs related to the same utterance. For example, if ASR system 258 outputs N text segments (as part of an N-best list), then NLU system 260 may process all N outputs.

As will be discussed further below, NLU system 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of speech-processing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device 10, speech-processing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of speech-processing system 200. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272, which is described in greater detail within FIG. 2B, may then attempt to identify relevant grammars and lexical information that may be used to construe meaning of the one or more results. To do so, NER system 272 may begin by identifying potential domains that may relate to the received query. NLU system 260 may include a databases of devices within storage/memory 254 of NLU system 260 that may be used to identify domains associated with specific devices. For example, electronic device 10 may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of user accounts system 268 and/or electronic device 10. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both communications and music, the query may, substantially in parallel, result in the natural language understanding processing using the grammar models and lexical information for communications, and the grammar models and lexical information for music. The responses based on the query produced by each set of models is scored, with the overall highest ranked result from all applied domains is ordinarily selected to be the correct result, which is described in greater detail below with reference to FIG. 2B.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a play music intent, "stop," to a stop playing music intent, and "mute" to a mute volume intent. IC system 276 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play { Song 1}."

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using tools such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}:"Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart" might produce a result of: {Domain} Shopping, {Intent} "Add item to," {Anaphoric Term}: "this," and {List Type} "cart."

The output from NLU system 260 (which may include tagged text, commands, etc.) may then be sent to orchestrator 250 and/or a command processor, which may be located on, or may be in communication with, speech-processing system 200. The destination command processor may be determined based on the output of NLU system 260. For example, if NLU system 260 outputs include a command to play music, the destination command processor may be a music playing functionality, such as one located on electronic device 10 or in a music playing functionality, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of functionalities for a particular user account, then the language model for the user account may be updated to include one or more invocations, utterance frameworks, response frameworks, and values for the frameworks, for a particular functionality.

In some embodiments, NLU system 260 may also include an entity resolution module 278, which allows NLU system 260 to query each domain of NLU system 260 to determine which domain or domains believe that they can handle a given request. Upon performing the query, each domain of domain system 272 may return a "score" indicating a likelihood that they can handle the request. For instance, various domains may return scores of LOW, MEDIUM, or HIGH, indicating the likelihood that they can handle the particular request. Entity recognition module 278 may return functionality names or titles for the request, which may be based on relevance scores that estimate a confidence that a particular functionality may be best used for the request. As an illustrative example, if the utterance is, "Play my music," NLU system 260 may determine, using entity resolution module 278, which domains, and thus functionalities, can likely handle this request, and may select the domain and/or functionality having the highest confidence score as being the domain and/or functionality able to handle the request. Furthermore, as described in greater detail below with reference to FIG. 2B, NLU system 260 may further include a slot filler module 276.

In some embodiments, NLU system 260 may include a contextual resolution system 270, which may be a system configured to identify entities for assisting natural language understanding processing using contextual metadata corresponding to content being displayed by display screen 212. Contextual resolution system 270 may receive contextual metadata from orchestrator 250 (e.g., that may be generated and sent from functionalities 262) and/or from electronic device 10. The contextual metadata my include information associated with the particular content currently being rendered by a requesting device. In some embodiments, the contextual metadata may be obtained in response to receiving audio data. For example, in response to receiving audio data representing an utterance, voice-controlled electronic device 10 may send a notification to speech-processing system 200 that indicates that content is currently being rendered by display screen 212.

In one embodiment, orchestrator 250 may be configured to receive the audio data, and may determine that the notification has also been received. Orchestrator 250 may determine whether or not the notification indicates that there is (or was) content displayed by display screen 212 at the time that the utterance was spoken (e.g., when the wakeword was uttered). However, persons of ordinary skill in the art will recognize that the determination of whether content is being displayed by display screen 212 may correspond to a time just prior to the wakeword being uttered, when the wakeword was uttered, after the wakeword was uttered, during the utterance being spoken, after the utterance was spoken, and/or after the audio data is sent to speech-processing system 200, and the aforementioned is merely exemplary. The notification may correspond to a flag, such as a logical 1/0, where if the flag has a value of 1, then this may indicate that content is being rendered by electronic device 10, whereas if the flag has a value of 0, then this may indicate that not content is being rendered by electronic device 10.

Upon determining that electronic device 10 is rendering content (e.g., receiving a notification indicating that content is being displayed by display screen 212), orchestrator 250 may generate and send a request to the various domains associated with functionalities system 262 and NLU system 260. The request may inquire as to which domain, or domains, are currently providing electronic device 10 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may provide the contextual metadata to contextual resolution system 270, or otherwise cause the contextual metadata to be sent to NLU system 260.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 212 during a time when an utterance is spoken. For example, single item or detail web page of an item, such as a coffee maker, may include entity data organized into contextual slots such as {Item Name}, {List Position}, and {Item Identifier}. Values from the particular web page being displayed currently by display screen 212 may include: {Item Name}: "Coffee Maker," {List Position}: "1," and {Item Identifier}: "abcd1234." Different types of content may include different contextual slots. For example, lists may include {List Types}, {List Position}, {List Name}, etc.

In some embodiments, contextual resolution system 270 may determine whether any slots/fields from intent resolution processing by NLU system 260 substantially match any slots/fields from the contextual metadata received. For instance, the entity data that is received from the domain may include similar entities (e.g. slots) as the entities associated with the intent identified by NLU system 260. This may include having contextual slots from the contextual metadata being associated with similar attributes as those of slots from intent resolution by NLU system 260. As an example, the "Play Music" intent may include slots for application (e.g., domain, skill, etc.) data—{Application Data Slot}, song name—{Song Name}, album name—{Album Name}, artist name—{Artist Name}, genre name—{Genre Name}, playlist name {Playlist Name}, media type—{Media Type}, sort type—{Sort Type}, play mode—{Play Mode}, service name—{Service Name}, anaphor—{Anaphor}, list position—{List Position}, recommend trigger—{Recommended Trigger}, and similar trigger—{Similar Trigger}. From NLU system 260, the text data may be used to identify some or all of the values for these slots. For example, if the utterance is, "Play 'Song 1'," then {Song Name} may have a value "Song 1." However, the remaining slots may remain unfilled. The contextual metadata may indicate information regarding a GUI displayed by display screen 212, where the GUI includes a detailed page associated with a song (e.g., "Song 1") or be a list including one item, the song. For example, the contextual metadata may include a song name contextual slot, {Song Name}, with a filled value being "Song 1," as well as an album name contextual slot, {Album Name}, having a filled value "Album 1." In this particular scenario, the album name contextual slot {Album Name} may be provided to NLU system 260.

Contextual resolution system 270 may, in some embodiments, be configured to determine that one or more of the declared slots from the intent matches one or more contextual entity slots from the contextual metadata. This may allow for resolution of the entity based on the contextual metadata. For example, if an individual says, "Play 'Song 1'," and the contextual metadata indicates that there is a contextual entity slot {Song Name} having a value "Song 1," then the specific song to be played may be determined to be the audio filed associated with "Song 1."

Contextual resolution system 270, in one embodiment, may be configured to determine a heuristics score that indicates a number of matching entities (e.g., matching slots) between the entity data/contextual metadata and the declared slots for the identified intent. For example, using the previous example, the contextual metadata may include such slots as {Song Name}, {Album Name}, and/or {Artist Name}, amongst other slots. Therefore, in this particular scenario, the heuristics score may be three, indicating that there are three slots corresponding to similar entities for both the declared slots from IC component 274 and contextual resolution system 270. If the heuristics score is greater than zero, then NLU system 260 may be configured to generate a selected context file that may be included with the output data from NLU system 260, which orchestrator 250 may provide back to a functionality of functionalities system 262 to perform, or attempt to perform, one or more actions.

Functionalities system 262 may, for example, correspond to various action specific functionalities, which are capable of processing various task specific actions and/or performing various functionalities. Functionalities system 262 may further correspond to first party applications and/or third party skills capable of performing various tasks or actions, or performing various functionalities. For example, based on the context of the audio received from electronic device 10, speech-processing system 200 may use a certain functionality to generate a response, or to obtain response information, which in turn may be communicated back to electronic device 10 and/or to another electronic device (e.g., a television). Functionalities system 262 may also include processor(s) 252, storage/memory 254, and communications circuitry 256.

In some embodiments, a feature of functionalities system 262 may be written in various computer languages, such as JavaScript and Java. Various functionalities may include an intent schema file and a sample utterances file, such as, for example, IntentSchema.json including the JSON defining the intents of a particular functionality, and a SampleUtterances.txt including plain text sample utterances for the particular functionality. Applications may also include functionality specific code, such as a JavaScript or Java file, common library code, and various other JavaScript or Java modules.

TTS system 264 may employ text-to-speech processing. However, processes for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

User accounts system 268 may store one or more user accounts or user profiles, corresponding to users having an account on speech-processing system 200. For example, a parent may have an account registered on speech-processing system 200, and each of the parent's children may have their own user profile registered under the parent's account. Information, settings, and/or preferences, for example, for each user profile may be stored by user accounts system 268. In some embodiments, user accounts system 268 may store a voice signal, such as voice biometric information, for a specific user profile. This may allow speaker identification processes to be used to match a voice to voice biometric data associated with a specific user profile. In some embodiments, user accounts system 268 may store a telephone number assigned to a particular user profile. In some embodiments, user accounts system 268 may include a list of media items currently stored within an individual's registered account or user profile. For example, a list of music or videos purchased or obtained by an individual may be stored within the individual's user profile on user accounts system 268, which may be accessed by the individual when the individual seeks to hear a particular song or songs, or view a particular video or videos. User accounts system 268 may also include a listing of all functionalities currently enabled for each user profile. In some embodiments, NLU system 260 may receive indications of which functionalities are currently enabled for a particular user profile or account, such that NLU system 260 is aware of which rules and capabilities that speech-processing system 200 is able to perform for the particular user profile or account.

Orchestrator 250, in a non-limiting embodiment, may correspond to any suitable device, system, and/or logic capable of performing one or more processes. For example, orchestrator 250 may be configured to request contextual metadata from one or more domains/skills of functionalities system 262 in response to receive a notification from electronic device 10 that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256.

Persons of ordinary skill in the art will recognize that although each of ASR system 258, NLU system 260, functionalities system 262, TTS system 264, user accounts system 268, and orchestrator 250 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, user accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 2B:
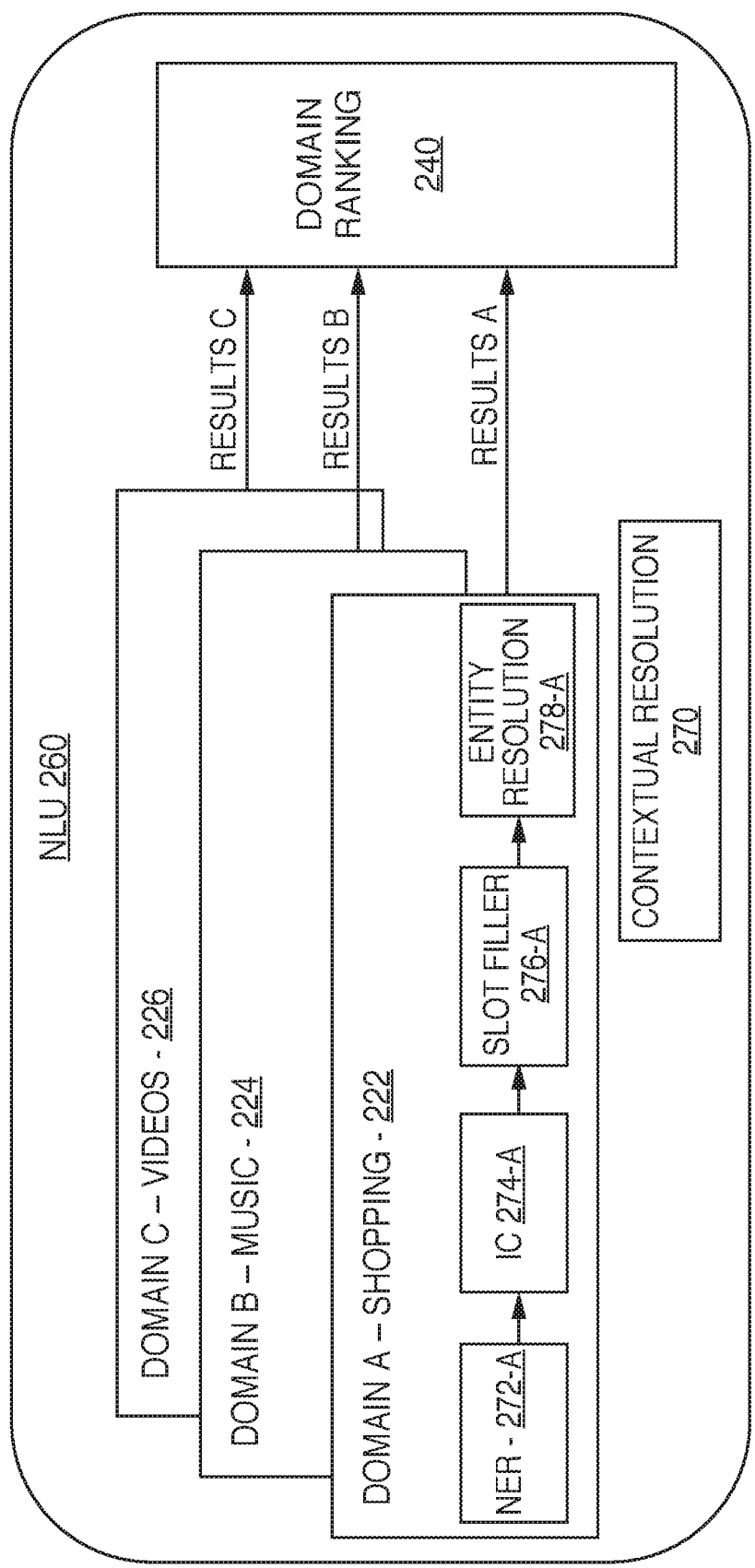
FIG. 2B is an illustrative diagram of a multi-domain architecture for performing natural language understanding (NLU) processing in connection with the system of FIG. 2A, in accordance with various embodiments.

FIG. 2B is an illustrative diagram of a multi-domain architecture for NLU system 260 of FIG. 2A, in accordance with various embodiments. In the multi-domain architecture of NLU system 260, each domain (which may include a set of intents and entity slots that define a larger concept such as music, books, etc.) may be constructed separately and be made available to NLU system 260 during runtime operations where natural language understanding functionality operations are performed on text (such as text output from ASR system 258). Each domain may have specially configured components to perform various steps of the NLU operations. For instance, each domain may include a component of NER system 272, IC system 274, Slot Filler system 276, and entity resolution system 278, which may be specific to that particular domain. In some embodiments, slot filler system 276 and/or entity resolution system 278 may be configured to perform their corresponding functions without deferring until after domain ranking has occurred, however persons of ordinary skill in the art will recognize that this is merely exemplary. Furthermore, a language model associated with a particular user account may specify various input and output characteristics of NLU system 260, which may vary from user to user based on that particular user's language model.

In the illustrative embodiment, a shopping domain 222 (Domain A) may have an NER component 272-A that identifies what slots, fields, or placeholders (i.e., portions of input text) may correspond to particular entities relevant to that domain. The NER component 272-A may use a machine learning model, such as a domain specific conditional random field ("CRF") to both identify the portions corresponding to an entity as well as identify what type of entity corresponds to the text portion. For example, for the text "Buy 'Coffee Maker'," an NER component 272-A trained for a shopping domain may recognize the portion of text (e.g., "Coffee Maker") corresponds to an entity and an item name. Shopping domain 222 may also have its own intent classification (IC) component 274-A that determines the intent of the text, assuming that the text is within the proscribed domain. IC components may use a model, such as a domain specific maximum entropy classifier, to identify the intent of the text. Shopping domain 222 may also have its own Slot Filler component 276-A that can apply rules or other instructions to standardize labels or tokens from previous stages into an intent/slot representation. The precise transformation may depend on the domain. For example, a travel domain may include a text mention of "<Location> airport," and may be transform the text mentioned to the standard three-letter code referring to that airport (e.g., ZZZ). Shopping domain 222 may also have its own Entity Resolution component 278-A that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). Using the example, "Buy 'Coffee Maker'," the source may be tied to a listing of functionalities and the functionality names associated with those functionalities. The output from Entity Resolution component 278-A may include a command, information, or other NLU result data indicating how the domain specific NLU processing handled the text and how the system should respond to the text, according to that specific domain.

As another example, a music domain 224 (Domain B) may have an NER component 272-B that may identify a portion of the input text that may refer to a particular slot. For example, for the text "play songs by 'Artist 1'," an NER component trained for a music domain may recognize the portion of text (e.g., "Artist 1") corresponds to an entity and an artist name. Music domain 224 may also have its own intent classification (IC) component 274-B that may determine the intent of the text, assuming that the text is within the proscribed domain. Music domain 224 may also have its own Slot Filler component 276-B that can apply rules or other instructions to standardize labels or tokens from previous stages into an intent/slot representation. Music domain 224 may also have its own Entity Resolution component 278-A that can refer to an authority source (such as a domain specific knowledge base) used to specifically identify the precise entity referred to in the entity mention identified in the incoming text. Furthermore, entity resolution component 276-D, as well as, in one embodiment, slot filler 276-C, may determine if an entity corresponds to the slot labeling. Specific intent/slot combinations may also be tied to a particular source, which may then be used to resolve the text (such as by providing information or a command to be executed in response to a user query). Using the example, "play songs by Artist 1," the source may be tied to a personal music catalog or the like. The output from Entity Resolution component may include a command, information, or other NLU result data indicating how the domain specific NLU processing handled the text and how the system should respond to the text, according to that specific domain.

In some embodiments, the multiple domains of NLU system 260 of FIG. 2B may operate substantially in parallel, with different domain specific components. That is, shopping domain 222, may have its own NER component 272-A, IC module 274-A, Slot Filler component 276-A, and Entity Resolution component 278-A. Music domain 224 may also have similar components, and so on for the different domains available to the system. The same text that is input into the NLU pipeline for Shopping Domain 222 may also be input into the NLU pipeline for Music Domain 224, where the components for Music Domain 224 may operate on the text as if the text related to Music Domain 224, and so on for the different NLU pipelines for the different domains. Each domain specific NLU pipeline will create its own domain specific NLU results, for example Results A for Shopping Domain 222, Results B for Music Domain 224, Results C for Video Domain 226, and so on. The different results may then be input into a domain ranking component 240, which may rank the different results for the different domains, and selects what the system believes to be the most applicable results given the input text and other factors. Those highest ranking results may then be used to execute a command, perform one or more actions, or obtain information responsive to a user query, or otherwise respond to the input text. In some embodiments, a list of hypotheses after all domains have completed named entity recognition and intent classification may be truncated, and the slot filling and entity resolution may occur on the un-truncated hypotheses. Reordering of the results may further be performed after the slot filling and entity resolution occurs. Persons of ordinary skill in the art will recognize that NLU system 260 may include any number of domains related to any particular subject, and the three domains included in FIG. 2B (e.g., Shopping Domain 222, Music Domain 224, and Video Domain 226) are merely exemplary.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU system 260 of FIG. 2B may result in only one such action being performed with any acknowledgement of ambiguity as the "Title" can refer to a book, movie, or soundtrack (or possibly all three).

Persons of ordinary skill in the art will further recognize that, in one embodiment, text data representing a response may be generated by speech-processing system 200. For instance, NLU system 260 and/or functionalities system 262 may be employed to determine contextual features of a response to be generated, and may generate the corresponding text data representing that response. The text data may then be provided to TTS system 264, which may generate audio data representing the text data, which may then be sent to the requesting device.

In some embodiments, NLU system 260 may include contextual resolution system 270, which may be employed to assist in resolving certain entities based on contextual metadata associated with displayed content. For example, electronic device 10 may display a detail web page of an item available for purchase by an individual. The detail web page may include contextual metadata indicating various entities associated with the item such as, but not limited to, an item name—{Item Name}, an item identifier—{Item Identifier}, and the like. In some embodiments, the contextual metadata may also include an anaphoric term, {Anaphoric Term}. If the text of an utterance is, for example, "Buy this," then NLU system 260 may identify that the intent as being a purchasing intent having an entity resolution "Buy," and may also include an anaphoric term "this." Based on this information available from the text data, the purchasing domain may not be able to determine the specific action to perform because the entity "this" may not be able to be associated with a particular item. In this illustrative example, the contextual metadata may assist a functionality for resolving missing entities. Contextual resolution system 270 may determine which, if any, entities match between the contextual metadata and the declared slots for a particular domain. For example, the purchasing intent may include a slot for an item name, and the contextual metadata may also include a slot for item name having a particular value associated with it. After shopping domain 222 outputs data including any resolved entities, contextual resolution system 270 may append the contextual metadata including the slot and the particular value associated with that slot to the output data. The output data may then be passed to the corresponding functionality identified by NLU system 260, and the functionality may use the output data including the selected context file to process the request. In one example, if a coffee maker having an item name "Coffee Maker" is displayed on display screen 212, then the contextual metadata may include a contextual slot for the entity {Item Name} having a value being "Coffee Maker." Furthermore, a unique identifier associated with the coffee maker having the item name "Coffee Maker" may be included for processing by shopping domain 222. Therefore, when shopping domain 222 outputs data to a shopping functionality, that output data may include contextual metadata indicating the unique identifier associated with the item.

FIG. 3 is an illustrative flowchart of an exemplary process for attempting to fulfill a request in accordance with various embodiments. Process 300, in a non-limiting embodiment, may begin at step 302. At step 302, first audio data may be received from an electronic device. The first audio data may represent an utterance that includes include a request. For instance, audio data representing an utterance that includes request 2 from FIG. 1A may be received by language processing system 200 from electronic device 10. At step 304, a user account associated with the electronic device may be determined. At step 306, ASR processing may be utilized to generate first text data representing the audio data. At step 308, NLU processing may be utilized to generate intent data representing the text data. The intent data may contain specific information related to the request. The intent data may correspond to a domain associated with the request. For example, a user may request to order a pepperoni pizza from a particular restaurant. The intent data may include the domain information (e.g., a "Food Ordering" domain, a "Restaurant Delivery" domain, etc.), as well as the specific parameters related to the user's request (e.g., pepperoni, pizza, from a specific restaurant). At step 310, a first skill may be determined to process the intent data. In some embodiments, the first skill may be assigned, according to a user's preferences, to be the first-choice skill for carrying out the intent. At step 312, a first instruction may sent to the first skill to process the intent data in order to fulfill the request. At step 314, a determination can be made as to whether the request was successfully fulfilled. If the request was successfully fulfilled, then at step 316, data may be received from the skill such that the data can be forwarded to the electronic device to output. When the data is received from the skill, the data may be forwarded directly to the electronic device. However, in some embodiments, audio and/or visual data may be generated from the data received from the skill and sent to the electronic device such that the electronic device outputs the audio and/or visual data.

In other embodiments, if the request was not successfully fulfilled (e.g., an error is detected), then the process may proceed to step 318. At step 318, it may be determined whether a transient error has occurred. In some embodiments, this may be performed by assessing the error to determine whether the request can be successfully fulfilled within a predetermined temporal interval (e.g., less than one second, less than 50 milliseconds, etc.). Such transient errors can include, but are not limited to: receiving a null value from the skill, timeouts (for instance, if a server associated with the ASR module is too busy to communicate with the NLU module, a time out may occur), receiving an "HTTP 404" response code rather than a "200 OK" response code, etc. While transient errors are shown to occur at step 318, such errors may occur at any time throughout process 300, as well as other processes and embodiments disclosed herein. If a transient error has not occurred, then the error may be a permanent error. As such, in some embodiments, rather than reattempt to fulfill the request, at step 320, an error notification may be generated.

At step 320, the error notification may be generated by generating text data that includes the error notification and using TTS to generate audio data that includes the error notification. However, for the sake of simplicity and clarity in FIG. 3, such additional steps are not shown therein. At step 322, the error notification may then be sent to the electronic device to output audio data that includes the notification. As such, an individual who initially sent the request can be informed that an error occurred.

In some embodiments, however, it may be advantageous to perform an additional attempt to attempt to fulfill the request and keep the individual informed of how the process is proceeding. As such, if it is determined at step 318 that a transient error has occurred, the process may proceed to step 324. At step 324, output text data may be generated. The output text data may represent language indicating that an error has occurred and that an additional attempt to fulfill the request is currently taking place. At step 326, output audio data may be generated from the output text data. For instance, in some embodiments, the output audio data may be generated using TTS processing. At step 328, the second audio data may be sent to the electronic device such that the electronic device outputs an audio representation of the second audio data.

At step 330, a second skill may be determined to process the intent data. This may allow the system a wide range of options for initiating further attempts to fulfill the request. For instance, in a second attempt to fulfill the request, a second instruction may be sent to the first skill to process the intent data while the electronic device is presenting the output audio data. In other embodiments, rather than initiate a second attempt using the first skill, process 300 may instead use the second skill to avoid potentially wasting time trying to utilize a skill that has already failed to fulfill the request.

In some embodiments in which a second attempt is made using the first skill, the second attempt may be a success. As such, process 300 may include additional steps not shown in FIG. 3. For instance, upon sending the third instruction to the first skill, data may be received from the skill that can be further processed and/or sent to the electronic device such that the electronic device outputs data fulfilling the request.

In some embodiments, the second attempt may not be a success. As such, process 300 may include additional steps involving further attempts to fulfill the request. For instance, in some embodiments, an additional error may be detected during the second attempt. In response, additional output text data (and output audio data therefrom) may be generated such that electronic device outputs audio data that includes language indicating to the user that another error occurred, and that an additional attempt to fulfill the request is being made. In yet another attempt to fulfill the request, a third instruction may be sent to a second skill to process the intent data, and so on, and so on, until the request is fulfilled. In similar embodiments, a user may wish for the system to make repeated attempts indefinitely until the request is fulfilled. In such embodiments, the system may send instructions to the electronic device to send a communication (e.g., by electronic device outputting audio data representing language) inquiring for permission to make repeated attempts until the request has been fulfilled. Upon receiving audio data from the electronic device that represents an affirmative response, the system may make repeated attempts indefinitely (or alternatively, for a predefined amount of time, or a predefined number of attempts) until the request is fulfilled. In other embodiments, at any point during process 300 (e.g., while initiating a second attempt, while presenting audio output data, etc.), an electronic device may interrupt process 300 to indicate via an utterance that the system should make repeated attempts until the request is fulfilled (e.g., the user utters "keep going until you get the song," "keep retrying," etc.). In alternative embodiments, if the system determines, based on a time limit, a certain number of failures, or any other factors, that the request cannot be processed at this time, then it accordingly generates output text and audio data such that the electronic device outputs audio data that includes language indicating that the request cannot be fulfilled at this time. At that point, the system may cease further attempts.

In some embodiments, the second skill may not be desirable for a user, and the user may prefer to utilize the first skill to fulfill the request. Accordingly, process 300 may include a step that involves determining that the second skill is not substantially equivalent to the first skill. For instance, in an illustrative embodiment, a user may desire to listen to a song. As such, process 300 may require a first music skill to process intent data to output an audio file corresponding to the song. If the first skill fails to fulfill this request, a second skill may be capable of processing the intent data by outputting a substantially equivalent audio file such that the audio file corresponds to the song. The audio signal generated by the audio file corresponding to the song may be substantially equivalent to audio files generated by several other skills (and audio files), including the first and second skill, and so it may be acceptable to the user to utilize any skill capable of outputting the song. However, in another illustrative embodiment, a user may wish to order a pizza. If the first skill is incapable of ordering the pizza, the user may not wish to utilize an alternative. For instance, if the first skill corresponds to a user's beloved restaurant, and the second skill corresponds to a restaurant reviled by the user, the restaurants corresponding to the first skill and to the second skill will not be substantially equivalent. Accordingly, in order to prevent a user from being provided with improper alternatives to the first skill, process 300 may include steps in which a system inquires for permission to utilize the second skill to process the intent data.

In some embodiments, the system may determine that the second skill is substantially different from the first skill such that it may be necessary to seek permission from the user before proceeding with the second skill. For instance, in some embodiments, it may be determined that within a particular domain, no skills are substantially equivalent (i.e., skills, functionalities, "restaurants," etc., may be substantially different to the extent that a user may not wish to utilize other skills in lieu of their preferred "first choice" skill). After generating and sending data representing a request for permission to use the second skill instead of the first skill, if the system receives audio data from the electronic device and determines, using ASR and NLU processing, that the audio data represents the necessary permission to utilize the second skill to process the intent data (i.e., order a pizza), then the process may proceed with utilizing the second skill to process the intent data using the various methods disclosed herein.

In some embodiments, the system may receive audio data representing a response in the affirmation along with an additional request. For instance, if a user's first request is to order a pizza, a first skill corresponding to a first restaurant may be utilized to fulfill the request. If the system requests permission to utilize a second skill corresponding to a second restaurant to fulfill the request, the system may send data to an electronic device such that the electronic device outputs data representing an inquiry for permission to utilize the second skill to fulfill the request. In response, a user may generate an utterance in the affirmative, adding or subtracting items from the original request. For instance, the user may generate the utterance "Yes, and add an order of chicken wings" in response to an inquiry for permission to utilize the second skill to fulfill the request. The addition of chicken wings may be represented as a second request which may be represented by second intent data. Accordingly, process 300 may involve an additional step of determining that the second skill is capable of fulfilling the second request. If the second skill is capable of fulfilling the second request, then the system may send instructions to the second skill to process the second intent data and thereby fulfill the request.

In other embodiments, the first skill may be determined to be unreliable for a particular user. Continuing the example in which the user requests a particular song, process 300 may include a step for determining, based on historical data, that previous attempts to utilize the first skill to fulfill the user's requests are frequently unsuccessful. In an exemplary embodiment, the intent data may correspond to an intent associated with the request. The intent may be a "Play Music" intent. Based on historical data, process 300 may determine that previous attempts to process the "Play Music" intent using the first skill have frequently resulted in errors. For instance, if a user's personal preferences result in a high frequency (e.g., the system calculates more than 60 percent of a total of 50 attempts) of errors in which the first skill does not have the requested song in its database, process 300 may include a step for sending instructions to an electronic device to output audio data representing an inquiry for permission to perform future first attempts to process the intent by initially selecting the second skill to process the request. In such embodiments, the first skill may be the "first choice" skill (i.e., the default skill through which any attempt to process the intent is initiated if data representing a specific request to utilize a specific skill is not received) and has been determined to be insufficient for processing the intent. If the system receives audio data representing a response in the affirmative, process 300 may include an additional step assigning the second skill as the "first-choice" skill for processing the intent. In other embodiments, process 300 may involve assigning the second skill as the "first-choice" skill autonomously, without inquiring for permission.

Figure 4:
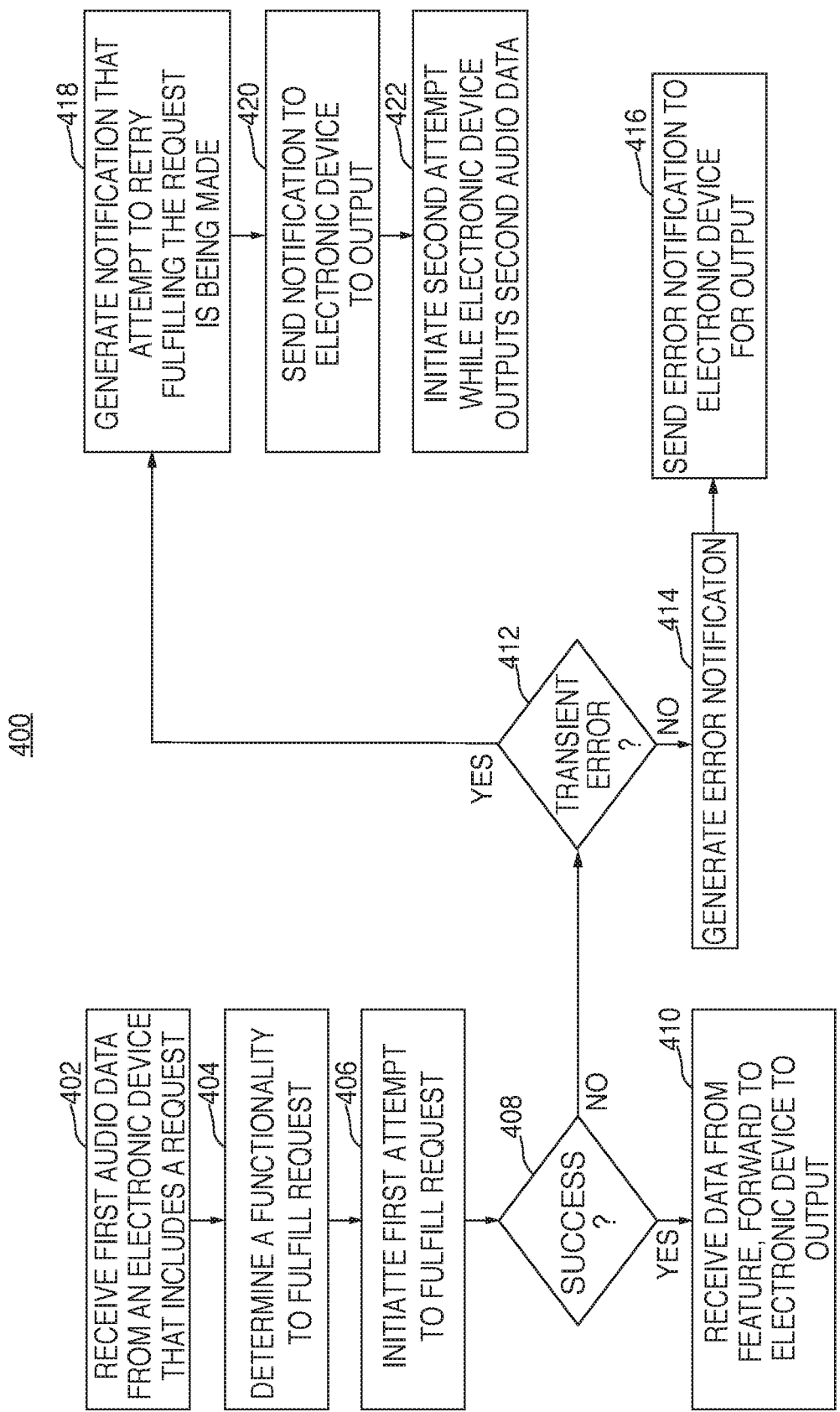
FIG. 4 is an illustrative flowchart of another process for to fulfill a request in accordance with various embodiments.

FIG. 4 is another illustrative flow chart of an exemplary process for attempting to fulfill a request in accordance with various embodiments. Process 400, in a non-limiting embodiment, may begin at step 402. At step 402, first audio data may be received from an electronic device. The first audio device may represent an utterance that includes a request. For instance, audio data that represents an utterance that includes request 5 of FIG. 1B may be received by language processing system 200 from electronic device 10. At step 404, an appropriate functionality for fulfilling the request may be determined (in other embodiments, the language processing system may be able to fulfill the request internally, without having to access any functionalities, applications, skills, or third party information). At step 406, a first attempt to fulfill the request may be initiated by sending instructions to the appropriate functionality to fulfill the request. At step 408, whether the request was fulfilled may be determined. If the request was fulfilled, then the process proceeds to step 410. At step 410, data may be received by the functionality and sent to the electronic device such that the electronic device outputs information that fulfills the request.

However, if at step 408, it is determined that the request was not fulfilled, then the process may proceed to step 412. At step 412, it may be determined whether a transient error has occurred. The determination that a transient error occurred at step 412 (versus a critical error or system fault) can allow the system to make another attempt to fulfill the request in an efficient manner. For instance, a simple failure by a language processing system to receive a response from a functionality, may only need for the inquiry to the functionality to be a repeated, in which case the language processing system can then receive the response it was seeking from the functionality in order to proceed with the remaining steps to fulfill the individual's request. As such, if at step 412 it is determined that a transient error has not occurred, then it may be determined that a permanent error (e.g., a critical error or system fault) has occurred and that further attempts to fulfill the request will not be successful. Accordingly, the process may proceed to step 414, during which a notification error may be generated and forwarded to the electronic device to output.

If, however, it has been determined at step 412 that a transient error has occurred, then the process may proceed to step 418. At step 418, a notification may be generated. The notification may be generated in the form of failure data, and may include information indicating that the first attempt did not fulfill the request and that an attempt to retry fulfilling the request is being made. In some embodiments, process 400 may include a step that involves determining that the electronic device includes a screen and one or more microphones. As such, in some embodiments, the electronic device may include a screen, and thus the notification may include audio data and visual data that can be provided by the electronic device. In some embodiments, the notification may include audio data, and the electronic device may output the notification as an audio representation of the audio data. In other embodiments, the notification may include visual data instead of audio data, and the electronic device may output the notification in a visual format. For instance, the electronic device may send instructions to another device that includes a display screen such that the notification can be displayed on the display screen. Alternatively, the electronic device may include a display screen and may simply display the notification on the display screen located on the electronic device. In other embodiments, the notification may include both audio and visual data, and the electronic device may output the notification as both an audio representation of the audio data and a visual representation of the visual data. For instance, in some embodiments, the electronic device may output an audio signal of a honking noise, a sustained beeping noise, a sound of broken glass, music, or any other audio signal that may be used to convey that an error has occurred. Additionally, in some embodiments, the electronic device may additionally (or alternatively) output a visual representation of the notification, such as one or more words to convey a message, a video, an image, a series of images, or any other visual representation that may be used to convey that an error has occurred. In some embodiments, the notification may be predetermined. For instance, a user's preferences may be stored in memory. The preferences may include, for instance, a particular audio signal or visual representation to be output upon the system determining that a transient error has occurred. In some embodiments, a user may select an image, slideshow, video, song, audio file, newsfeed, sports scores, or other audio or visual data associated with the user's account preferences. For instance, the system may cause a newsfeed to be displayed or presented using the electronic device (and, in some embodiments, a display screen) to provide the news to a user while the user waits for the request to be fulfilled. In another illustrative example, a user may upload from a user device one or more representations of audio or visual data to associate with a user's account. As such, one or more representations of audio or visual data may be stored in memory as preferences to be used to generate a notification at step 418.

At step 420, the notification may be sent to the electronic device for presentation such that the electronic device outputs the notification. At step 422, a second attempt to fulfill the request may be initiated. In some embodiments, step 22 may occur while (e.g., at substantially the same time) the electronic device is outputting the notification.

In various embodiments, it may be desirable to maintain records of system failures in order to detect and resolve any structural defects in the system or determine other areas for improvement within the system. Accordingly, additional steps not disclosed in FIGS. 3 and 4 may involve generating a record of the events involving failures to fulfill requests. In various embodiments, the record may include a timestamp, all audio data associated with the request, as well as identification information associated with the electronic device. Additionally, the record may include any information regarding each attempt to fulfill the request. For instance, the record may include the cause of the one or more failures, audio, text, and other files associated with the notification, whether the user decided to cancel the request, the amount of time and/or attempts that it took to ultimately fulfill the request, and any other information related to the events and circumstances relating to the request. The record may be transmitted to a database.

In various embodiments, it may be determined that a functionality is not capable of fulfilling the request. Thus, an alternative functionality may be determined, and additional attempts may be made by sending instructions to the alternative functionality to fulfill the request. For instance, in some embodiments, a user's request may involve playing a particular song. As such, process 400 may be performed, and it may be determined at steps 408 and 412 that the request cannot be fulfilled because the particular song is not available on the first functionality determined at step 404 to be appropriate for fulfilling the request. Accordingly, a notification may be generated that provides information that the song was not located by that functionality. While the notification is being output by the electronic device, an alternative functionality may be determined to fulfill the request. Thus, an additional attempt may initiated by sending instructions to the alternative functionality to fulfill the request. If the alternative functionality locates the requested song, data corresponding to the requested song received by the alternative functionality and forwarded to the electronic device such that the electronic device plays the song.

In various embodiments, it may be desirable to limit the amount of attempts to retry fulfilling requests. For instance, in processes 300 and 400, a timer may be utilized to require that the request must be fulfilled within a specified time interval. As such, an infinite amount of attempts may be performed within the time interval. If the request has not been fulfilled within that time interval, then processes 300 and 400 may proceed to steps 318 and 414, respectively, which involve generating a notification that the attempt to fulfill the request has failed, and performing no additional attempts to fulfill the request. In various other embodiments, a predetermined amount of attempts may be specified such that processes 300 and 400 may proceed to steps 318 and 414, respectively, if the request has not been fulfilled within the specified predetermined amount of attempts.

In some embodiments, one or more steps of processes 300 and 400 may be performed at substantially the same time such that they occur in parallel with one another, which may reduce latency and improve the user experience. For instance, steps 312, 316, 318, and 320 of process 300 may each occur in parallel with one another. As another illustrative example, at step 306, ASR system 258 may output multiple text data models in the form of a lattice or an N-best list with each text data model corresponding to a confidence score or other score (such as probability scores, etc.). Accordingly, the first text data model, which has the highest confidence score of the multiple text data models, may be used and process 300 may proceed to step 308. While NLU processing are being employed using the first text data model, step 306 may be repeated in order to determine whether a second text data model having a confidence score higher than the first text data model may be generated. If the second text data model can be generated, then it replaces the first text data model and process 300 proceeds again to step 308 using the second text data model. As another illustrative example, using NLU processing at step 308 to determine a functionality that can be used to fulfill the request may be performed such that a functionality must be determined at a score within a predetermined range or threshold. For instance, each domain of domain system 272 may return a "score" indicating a likelihood that they can handle the request. If no domain of domain system 272 returns a score of HIGH, then process 300 may determine that a first domain of domain system 272 that returns a score of MEDIUM is capable of fulfilling the request and a first attempt to fulfill the request is initiated by sending instructions to the first domain to fulfill the request. Meanwhile, NLU processing may be used to determine whether a second domain of domain system 272 is available that returns a score of HIGH. At that point, process 300 might cease utilizing the first domain to fulfill the request in favor of utilizing the second domain, sending the instructions to the second domain to fulfill the request.

The above-described embodiments of the invention are presented for purposes of illustration and are not intended to be limiting. Although the subject matter has been described in language specific to structural features, it is also understood that the subject matter defined in the appended claims is not necessarily limited to the specific features described. Rather, the specific features are disclosed as illustrative forms of implementing the claims.

What is claimed is:

1. A method, comprising:
receiving, from an electronic device, first audio data representing a first utterance that includes a request;
determining user account data associated with the electronic device;
processing the first audio data to generate intent data corresponding to the first utterance;
determining, using preference data associated with the user account data, a first skill as being a preferred skill to be used to process the intent data;
sending a first instruction to the first skill to process the intent data;
receiving, from the first skill, failure data representing a first error occurred during the first skill processing the intent data;
determining to perform at least one additional attempt to respond to the request within a time interval;
generating, in response to determining that the first error occurred, first output text data indicating an error occurred and that an additional attempt to respond to the request is being made;
generating, using text-to-speech (TTS) processing, first output audio data from the first output text data;
sending the first output audio data to the electronic device;
within the time interval and in response to the first error occurring, determining a second skill to process the intent data, the second skill being different than the first skill;
sending a second instruction to the second skill to process the intent data;
generating second output text data representing requesting permission to assign the second skill as an updated preferred skill;
generating, using TTS processing, second output audio data from the second output text data;
sending the second output audio data to the electronic device;
receiving second audio data representing a second utterance; and
based on the second utterance, using the updated preferred skill to respond to future requests.

2. The method of claim 1, further comprising:
prior to sending the second instruction and within the time interval, sending a third instruction to the first skill to process the intent data;
determining that a second error occurred in the first skill processing the intent data;
within the time interval and in response to the second error occurring, generating third output text data indicating another error occurred and that an additional attempt to respond to the request is being made;
generating, using TTS processing, third output audio data from the third output text data; and
sending the third output audio data to the electronic device.

3. The method of claim 1, further comprising:
determining that the second skill is substantially different from the first skill;
generating third output text data representing an inquiry for permission to use the second skill to process the intent data;
generating, using TTS processing, third output audio data from the third output text data; and
sending the third output audio data to the electronic device.

4. A method, comprising:
receiving, from a first device, first input data;
determining, from the first input data, first intent data;
determining, using the first intent data and preference data, a first functionality as being a preferred functionality to be used to respond to the first input data;
initiating, using the first functionality, a first attempt to process the first intent data;
determining that a first error occurred during the first attempt;
determining, using the first intent data, a second functionality to be used to respond to the first input data, the second functionality being different than the first functionality;
initiating, in response to determining that the first error occurred, a second attempt to process the first intent data using the second functionality;
determining, based on historical data, that previous attempts to process the first intent data using the first functionality have resulted in errors;
in response to the first functionality resulting in the errors, generating first output data requesting permission to represent the second functionality as an updated preferred functionality; and
sending the first output data to the first device.

5. The method of claim 4, further comprising:
sending, to the first device, second output data representing permission to use the second functionality to process the first intent data;
receiving, from the first device, second audio input data; and
in response to receiving the second input data, initiating the second attempt.

6. The method of claim 4, wherein the second input data represents a request, and the method further comprises:
determining, based on the second input data, second intent data;
determining that the second functionality is capable of processing the second intent data; and
initiating the second attempt to process the second intent data using the second functionality.

7. The method of claim 4, further comprising:
determining that a second error occurred during the second attempt;
generating failure data indicating that the first and second attempts to process the first intent data have failed, the failure data further representing an inquiry for permission to initiate repeated attempts to process the first intent data until the first intent data is successfully processed;
receiving second input data; and
initiating, based on the second input data, a third attempt to process the first intent data.

8. The method of claim 4, further comprising:
assessing, prior to initiating the second attempt, the first error to determine additional attempts to process the first intent data can be made within a predetermined temporal interval; and
determining, based on assessing the first error, that additional attempts to process the first intent data can be made within the predetermined temporal interval.

9. The method of claim 4, further comprising:
determining that a second error occurred during the second attempt;
generating failure data indicating that the second attempt failed to process the first intent data and that a third attempt to process the first intent data is being made;

sending the failure data to the first device for presentation; and initiating a third attempt to process the first intent data using the second functionality.

10. The method of claim 9, further comprising:
determining that the first intent data represents a request to use visual information;
determining a user account associated with the first device;
determining that a display screen is associated with the first device; and
displaying a first notification via the display screen, the first notification comprising, based on the preference data, at least one of: an image, a series of images, and a video.

11. The method of claim 10, wherein the at least one image, series of images, and video being randomly selected from a database located on a second device that is separate from the first device and associated with the user account.

12. The method of claim 4, further comprising:
generating a record including a timestamp, the first input data, identification information associated with the first device and information regarding the first and second attempts; and
sending the record to a database.

13. The method of claim 4, further comprising:
at a time period prior to receiving the first input data, receiving permission data indicating authorization to perform multiple attempts using at least the first functionality and the second functionality to process input data; and
initiating the second attempt to process the first intent data without further input from a user.

14. The method of claim 4, wherein determining that the first error occurred comprises:
determining that there was no error in determining the first intent data from the first input data; and
determining that the first error corresponds to the first functionality.

15. The method of claim 4, further comprising:
generating failure data indicating that the first attempt failed to process the first intent data using the first functionality within a time interval and that the second attempt is being made;
sending the failure data to the first device; and
initiating, in response to determining that the first error occurred, a second attempt to process the first intent data using the second functionality.

16. The method of claim 4, further comprising:
determining that the first error corresponds to a first error type; and
initiating the second attempt based at least on part in the first error corresponding to the first error type.

17. The method of claim 16, further comprising:
receiving, from a second device, third input data;
determining, from the third input data, second intent data;
determining, using the second intent data, a third functionality to be used to process the second intent data;
initiating, using the third functionality, a third attempt to process the second intent data;
determining that a second error occurred during the third attempt;
determining that the second error corresponds to a second error type;
instead of initiating a fourth attempt, based at least in part on the second error corresponding to the second error type, generating second output data indicating that processing of the third input data failed; and
sending the second output data to the second device.

18. A system, comprising:
at least one processor; and
at least one memory including instructions that, when executed by the at least one processor, cause the system to:
receive, from a device, first input data;
determine, from the first input data, first intent data;
determine, using the first intent data, a first functionality to be used to process the first intent data;
initiate, using the first functionality, a first attempt to process the first intent data;
determine that an error occurred in the first attempt;
determine that the error corresponds to a first error type;
based at least in part on the error corresponding to the first error type, determine to perform at least one additional attempt to process the first intent data within a time interval;
generate first failure data indicating that the first attempt failed to process the first input data and that an additional attempt to process the first input data is being made;
send the first failure data to the device;
determine, using the first intent data, a second functionality, the second functionality being different than the first functionality; and
within the time interval and in response to the error occurring, initiate a second attempt to process the first intent data using the second functionality.

19. The system of claim 18, wherein the first intent data corresponds to an intent, the first functionality being previously assigned as a first-choice functionality for processing the intent, the at least one processor being further operable to:
assign the second functionality as the first-choice functionality for processing the intent.

20. The system of claim 19, further comprising a display screen, the at least one processor being further operable to:
determine that the first input data includes a request to use visual information;
determine a user account associated with the device;
determine that the device is associated with the display screen;
determine a user preference associated with the user account; and
display the first failure data via the display screen, the first failure data representing, based on the user preference, at least one of: an image, a series of images, and a video.

21. The system of claim 20, further comprising:
a user device associated with the user account, the user device comprising:
memory; and
data representing at least one of: an image, series of images, and video stored in memory, wherein the at least one image, series of images, and video are stored in the memory of the user device.

22. The system of claim 18, wherein the instructions that, when executed by the at least one processor, further cause the system to:
receive, from the device, second input data;
determine, from the second input data, second intent data;
determine, using the second intent data, a third functionality to process the second intent data;

initiate, using the third functionality, a third attempt to process the second intent data;
determine that a second error occurred during the third attempt;
determine that the second error corresponds to a second error type;
instead of initiating a fourth attempt, based at least in part on the second error corresponding to the second error type, generate second output data indicating that processing of the second input data failed; and
send the second output data to the device.

* * * * *